(12) United States Patent
Ito

(10) Patent No.: US 10,604,205 B2
(45) Date of Patent: Mar. 31, 2020

(54) VEHICLE

(71) Applicant: HONDA MOTOR CO., LTD., Tokyo (JP)

(72) Inventor: Masamoto Ito, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 137 days.

(21) Appl. No.: 15/845,273

(22) Filed: Dec. 18, 2017

(65) Prior Publication Data

US 2018/0178871 A1 Jun. 28, 2018

(30) Foreign Application Priority Data

Dec. 27, 2016 (JP) .................... 2016-254454

(51) Int. Cl.

| | | |
|---|---|---|
| B62K 19/00 | (2006.01) | |
| B62K 19/32 | (2006.01) | |
| B62K 11/14 | (2006.01) | |
| B62K 5/08 | (2006.01) | |
| B62H 5/02 | (2006.01) | |
| B62K 21/22 | (2006.01) | |
| B62K 25/08 | (2006.01) | |
| B62M 7/02 | (2006.01) | |
| B62J 99/00 | (2020.01) | |

(52) U.S. Cl.

CPC ............ B62K 19/32 (2013.01); B62H 5/02 (2013.01); B62K 5/08 (2013.01); B62K 11/14 (2013.01); B62K 21/22 (2013.01); B62K 25/08 (2013.01); B62M 7/02 (2013.01); *B62J 2099/002* (2013.01); *B62K 2207/02* (2013.01)

(58) Field of Classification Search

CPC ........ B62K 19/32; B62K 21/22; B62K 11/14; B62K 11/00; B62H 5/02; B62M 7/02
USPC .................. 180/219, 220, 222; 280/263, 272
See application file for complete search history.

(56) References Cited

U.S. PATENT DOCUMENTS

| | | | |
|---|---|---|---|
| 7,674,023 B2 * | 3/2010 | Ohira .................. | B60Q 1/0035 180/218 |
| 7,870,921 B2 * | 1/2011 | Terada .................... | B62M 6/60 180/206.1 |

(Continued)

FOREIGN PATENT DOCUMENTS

| | | |
|---|---|---|
| JP | 2014-144751 A | 8/2014 |
| JP | 2014-172586 A | 9/2014 |

OTHER PUBLICATIONS

Japanese Office Action, dated Jul. 31, 2018, for Japanese Application No. 2016-254454, with an English machine translation.

(Continued)

*Primary Examiner* — Tony H Winner
(74) *Attorney, Agent, or Firm* — Birch, Stewart, Kolasch & Birch, LLP

(57) ABSTRACT

A vehicle includes a vehicle frame, a steering swivel unit supported on a head pipe of the vehicle frame and angularly movable about a steering axis, a steering handle mounted on the steering swivel unit, and a cover assembly covering the steering swivel unit from above, wherein the cover assembly includes a fixed cover fixed to a vehicle body and a movable cover covering an upper opening defined in the fixed cover, and the movable cover is angularly movable in unison with the steering handle.

17 Claims, 26 Drawing Sheets

(56) References Cited

U.S. PATENT DOCUMENTS

| | | | | |
|---|---|---|---|---|
| 2009/0050391 A1* | 2/2009 | Nobuhira | ............... | B62M 7/02 |
| | | | | 180/219 |
| 2014/0265224 A1 | 9/2014 | Takenaka et al. | | |
| 2016/0076494 A1* | 3/2016 | Nishimura | ............. | B62K 11/00 |
| | | | | 180/219 |
| 2016/0114851 A1* | 4/2016 | Huang | ................... | B62H 5/02 |
| | | | | 180/219 |

OTHER PUBLICATIONS

U.S. Appl. No. 15/845,454, filed Dec. 18, 2017.
U.S. Appl. No. 15/845,156, filed Dec. 18, 2017.

\* cited by examiner

VEHICLE

INCORPORATION BY REFERENCE

The present application claims priority under 35 U.S.C. § 119 to Japanese Patent Application No. 2016-254454 filed on Dec. 27, 2016. The content of the application is incorporated herein by reference in its entirety.

TECHNICAL FIELD

The present invention relates to a vehicle.

BACKGROUND ART

Heretofore, there has been known a vehicle which is provided with a steering swivel unit supported on a head pipe of a vehicle frame and angularly movable about a steering axis and a steering handle mounted on the steering swivel unit (see, for example, Patent Document 1).

PRIOR ART DOCUMENT

Patent Document

[Patent Document 1]
Japanese Patent Laid-Open No. 2014-172586

SUMMARY OF THE INVENTION

Problem to be Solved by the Invention

There are situations where it is desirous of covering and concealing a peripheral area around the steering swivel unit with a cover assembly. However, since the steering swivel unit and the steering handle are angularly movable, it is difficult to widely cover the peripheral area around the steering swivel unit with a cover assembly.

The present invention has been made under the circumstances referred to above. It is an object of the present invention to widely cover a peripheral area around a steering swivel unit with a cover assembly.

Means for Solving the Problem

According to the aspect of the present invention, there is provided a vehicle including a vehicle frame (11), a steering swivel unit (13) supported on a head pipe (17) of the vehicle frame (11) and angularly movable about a steering axis (Cs), and a steering handle (26) mounted on the steering swivel unit (13). The vehicle includes a cover assembly (810) covering the steering swivel unit (13) from above, wherein the cover assembly (810) includes a fixed cover (811) fixed to a vehicle body (10) and a movable cover (812) covering an upper opening (813e) defined in the fixed cover (811) and is angularly movable with respect to the fixed cover (811), and the movable cover (812) is angularly movable in unison with the steering handle (26).

In the above invention, the movable cover (812) may have an opening (812c) defined in an upper wall of the movable cover (812), and a handle holder (560) that supports the steering handle (26) on the steering swivel unit (13) may be fitted in the opening (812c).

In the above invention, the opening (812dc) may be shaped complementarily to an outer profile of the handle holder (560).

In the above invention, the movable cover (812) may have an upwardly extending rib (812d) formed along a peripheral edge of the opening (812c).

In the above invention, the movable cover (812) may include an upper wall (812a) which is circular in shape as viewed along the steering axis (Cs) and a hollow cylindrical peripheral wall (812b) extending from a peripheral edge of the upper wall (812a) toward the fixed cover (811).

In the above invention, the vehicle may further includes a front cover (27) which covers the head pipe (17) on a front side of the head pipe (17), and the front cover (27) may include an extension cover (27c) extending rearwardly from an upper edge (27b) of the front cover, the extension cover (27c) having a rear edge (27d) contiguous to a front edge of the movable cover (812).

In the above invention, the vehicle may further include a steering handle turning mechanism (540) that makes the steering handle (26) angularly movable about the steering axis (Cs) relatively to the steering swivel unit (13), wherein the cover assembly (810) covers the steering handle turning mechanism (540) from above.

Advantageous Effects of the Invention

A vehicle according to the present invention includes a steering swivel unit angularly movable about a steering axis, a steering handle mounted on the steering swivel unit, and a cover assembly covering the steering swivel unit from above, wherein the cover assembly includes a fixed cover fixed to a vehicle body and a movable cover covering an upper opening defined in the fixed cover and is angularly movable with respect to the fixed cover, and the movable cover is angularly movable in unison with the steering handle. With this arrangement, the fixed cover fixed to the vehicle body and the movable cover covers the steering swivel unit from above. Since the movable cover is angularly movable in unison with the steering handle, it covers a wide peripheral area around the steering swivel unit.

In the above invention, the movable cover may have an opening defined in an upper wall thereof, and a handle holder that supports the steering handle on the steering swivel unit may be fitted in the opening. With this arrangement, the movable cover is positioned by the handle holder and covers a wide area around the handle holder.

In the above invention, the opening may be shaped complementarily to an outer profile of the handle holder. With this arrangement, the movable cover is positioned to a nicety by the handle holder and covers a wide area around the handle holder.

In the above invention, the movable cover may have an upwardly extending rib formed along a peripheral edge of the opening. With this arrangement, the rib increases the rigidity of the movable cover and covers the handle holder sideways. In case the rib abuts against the handle holder, the movable cover and the handle holder are held in abutment against each other over an increased area, making it possible to position the movable cover effectively on the handle holder.

In the above invention, the movable cover includes an upper wall which is circular in shape as viewed along the steering axis and a hollow cylindrical peripheral wall extending from a peripheral edge of the upper wall toward the fixed cover. With this arrangement, even when the movable cover is angularly moved, the movable cover is not likely to present an obstacle to surrounding parts. Accordingly, the movable cover may be of an increased size to cover a wide range.

In the above invention, the vehicle may include a front cover which covers the head pipe on a front side thereof, and the front cover may include an extension cover extending rearwardly from an upper edge thereof, the extension cover having a rear edge contiguous to a front edge of the movable cover. With this arrangement, the extension cover covers the space between the upper edge of the front cover and the front edge of the movable cover.

In the above invention, the vehicle may include a steering handle turning mechanism that makes the steering handle angularly movable about the steering axis relatively to the steering swivel unit, wherein the cover assembly covers the steering handle turning mechanism from above. With this arrangement, the cover assembly effectively conceals the steering handle turning mechanism.

MODES FOR CARRYING OUT THE INVENTION

Figure 1:
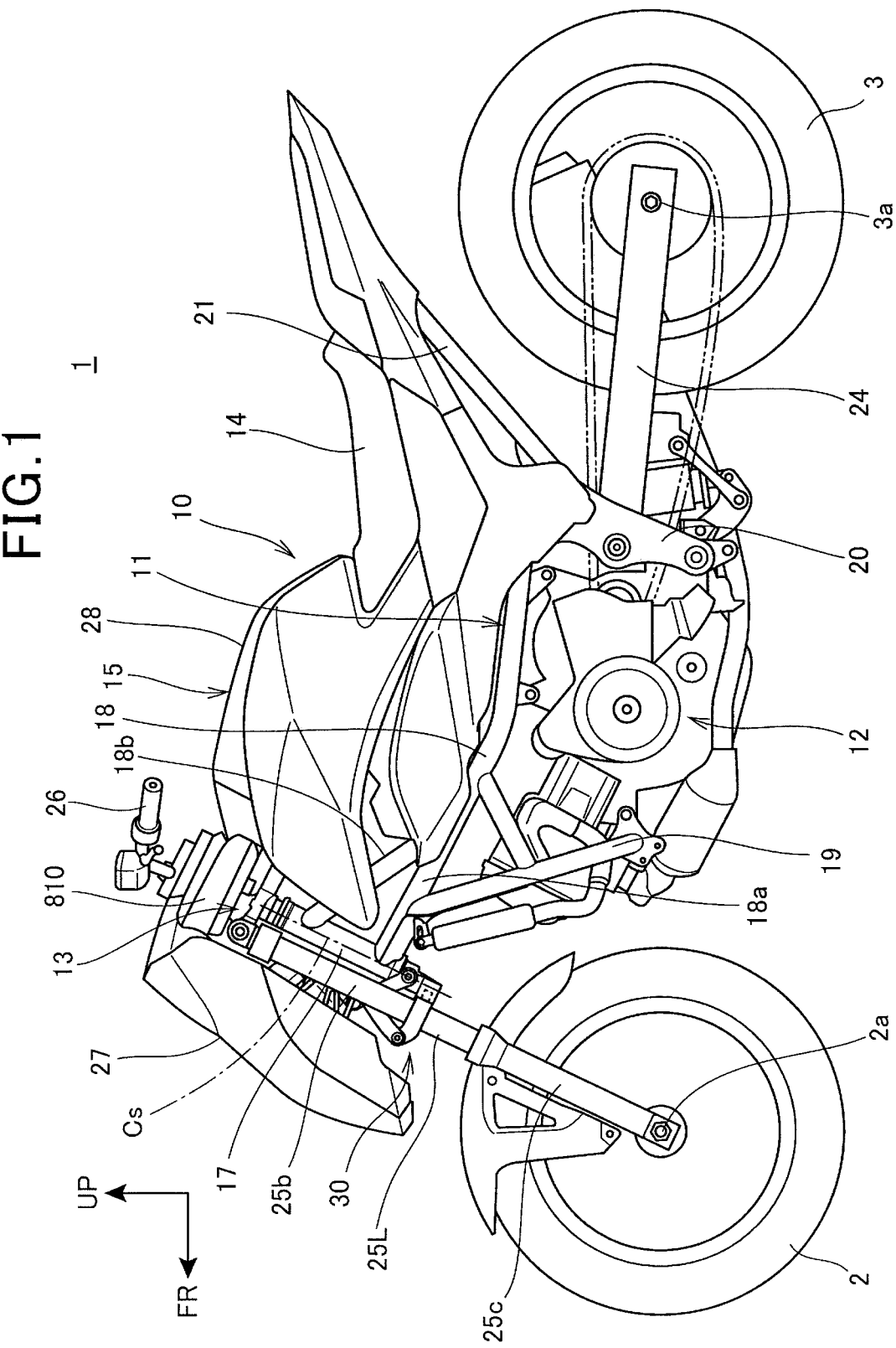
FIG. 1 is a left-hand side elevational view of a vehicle according to a first embodiment of the present invention.

Embodiments of the present invention will be described below with reference to the drawings. Unless specified otherwise, directions such as forward, rearward, leftward, rightward, upward, downward, and similar directions referred to herein shall be identical to those used on a vehicle to be described below. The reference characters "FR," "UP," and "LH" depicted in some figures of the drawings represent forward, upward, and leftward directions, respectively, on the vehicle.

First Embodiment

FIG. 1 is a left-hand side elevational view of a vehicle 1 according to a first embodiment of the present invention.

As depicted in FIG. 1, the vehicle 1 includes a motorcycle having a vehicle body 10, a front wheel 2 disposed forwardly of the vehicle body 10, a rear wheel 3 disposed rearwardly of the vehicle body 10.

The vehicle body 10 includes a vehicle frame 11, an engine 12 serving as a power unit supported on the vehicle frame 11 for propelling the vehicle 1, a steering swivel unit 13 angularly movable about a steering axis Cs on the front end of the vehicle frame 11, a seat 14 for the rider (driver) to sit thereon, and a vehicle cover 15 covering the vehicle frame 11, etc. The vehicle 1 may also be referred to as a saddle riding vehicle with the rider sitting astride the seat 14.

The rear wheel 3 is a propulsive drive wheel that is rotated by the power of the engine 12. Alternatively, the front wheel 2 may be a propulsive drive wheel with an electric motor incorporated therein for rotating the front wheel 2.

The vehicle frame 11 has a head pipe 17 disposed on the front end thereof and supporting the steering swivel unit 13 thereon, a main frame 18 extending rearwardly and downwardly from the head pipe 17, a down frame 19 extending downwardly from a front portion of the main frame 18, a pivot frame 20 extending downwardly from a rear portion of the main frame 18, and a seat frame 21 extending rearwardly from an upper portion of the pivot frame 20.

The head pipe 17 includes a tubular component inclined rearwardly from a vertical direction as viewed in side elevation. The head pipe 17 is disposed centrally in the vehicle 1 along transverse directions thereof, i.e., leftward and rightward directions thereof, as are the front wheel 2 and the rear wheel 3. The steering axis Cs is in alignment with the axis of the head pipe 17.

The vehicle 1 also includes a front fork including left and right front fork legs 25L and 25R (front wheel support members) supported on the steering swivel unit 13 and extending forwardly and downwardly therefrom, and a swing arm 24 extending rearwardly from the pivot frame 20 and supporting the rear wheel 3 on its rear end. The rear wheel 3 is rotatably supported on the rear end of the swing arm 24 by an axle 3a provided thereon.

The front fork legs 25L and 25R are disposed as a pair on the left and right sides of the front wheel 2. The front wheel 2 is rotatably supported on the lower ends of the front fork legs 25L and 25R by an axle 2a provided thereon which extends in the transverse directions of the vehicle 1.

The front fork legs 25L and 25R rotate in unison with the steering swivel unit 13. A steering handle 26 that is manipulated by the rider is mounted on an upper portion of the steering swivel unit 13 by a steering handle turning mechanism 540 (FIG. 5) that serves as a handle support member. When the rider turns the steering handle 26, the steering swivel unit 13 turns about the steering axis Cs, steering the front wheel 2 to the left or right.

The vehicle cover 15 has a front cover 27 positioned forwardly of the head pipe 17 and a tank cover 28 covering an area between the head pipe 17 and the seat 14.

Basic technical features of the present embodiment will be described below with reference to FIGS. 2 through 4B.

Figure 2:
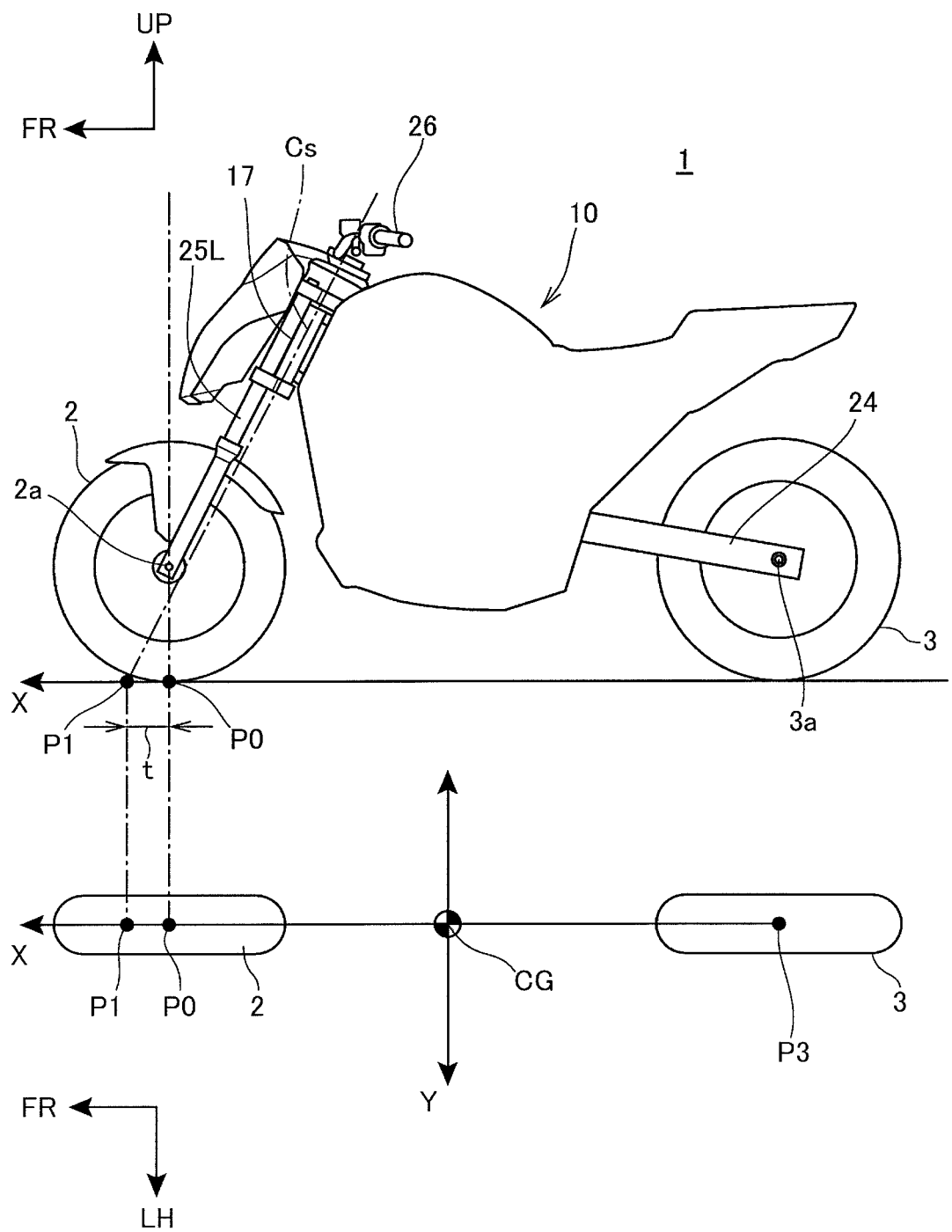
FIG. 2 is a left-hand side elevational view of the vehicle where the trail length is positive.
Figure 3:
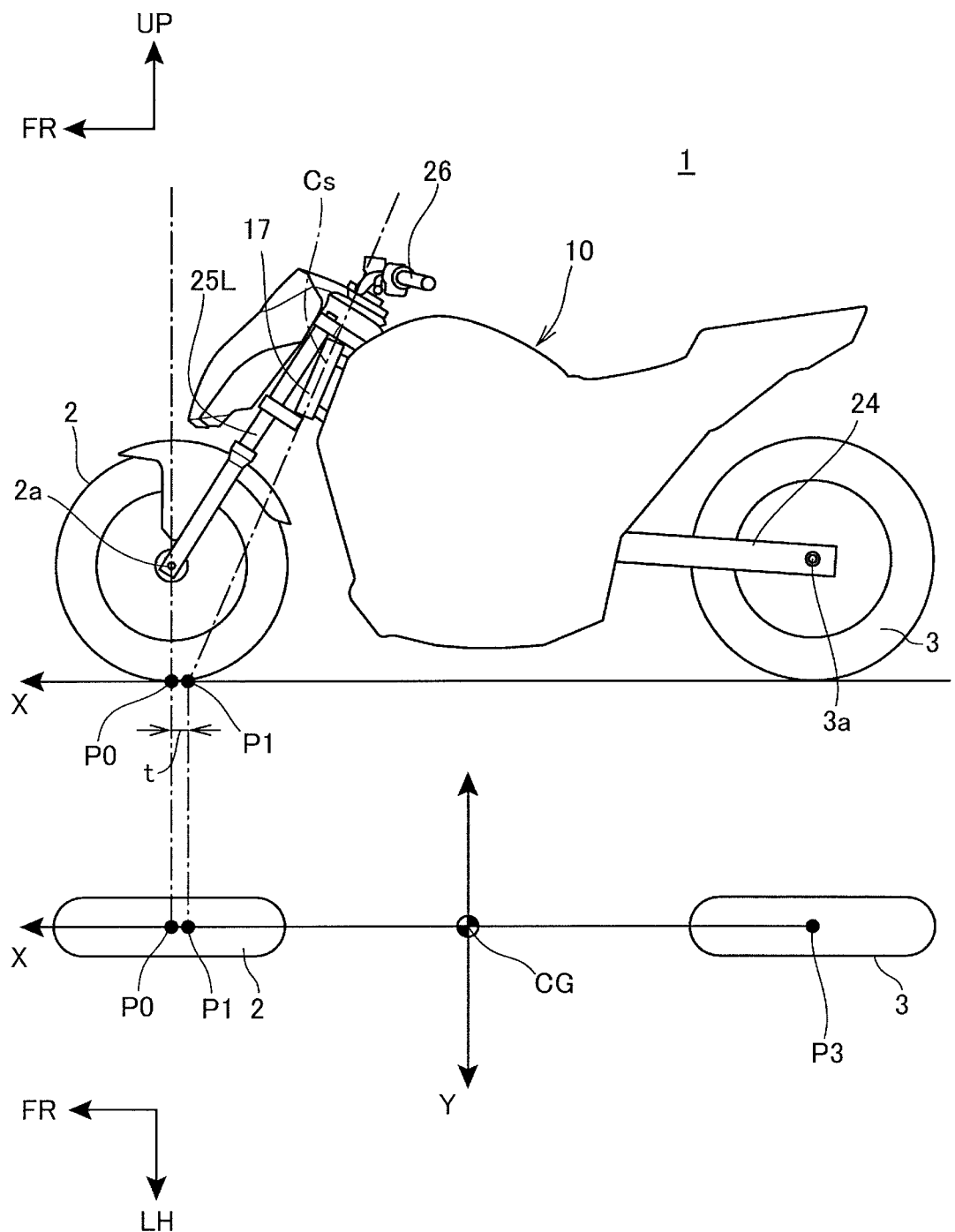
FIG. 3 is a left-hand side elevational view of the vehicle where the trail length is negative.
Figure 4A:
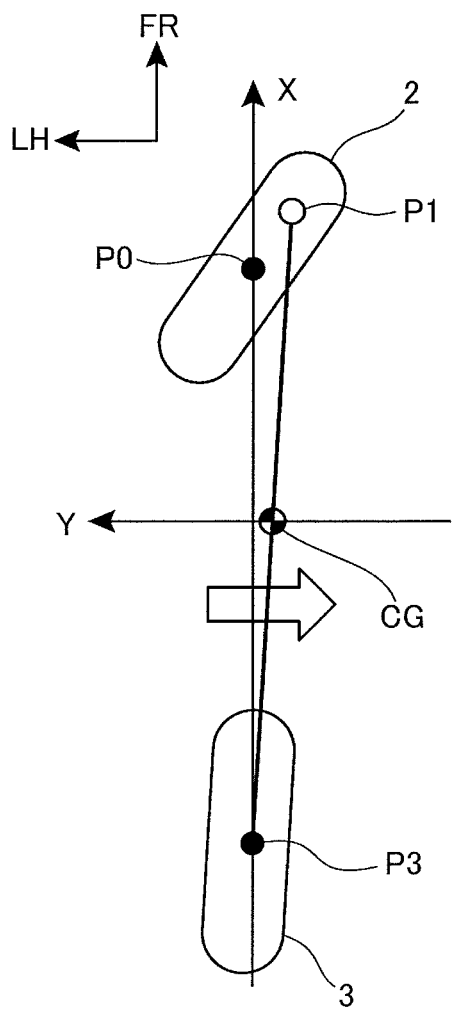
FIGS. 4A and 4B are schematic views depicting the relationship between the steering direction of a front wheel and the position of the center of gravity of the vehicle.
Figure 4B:
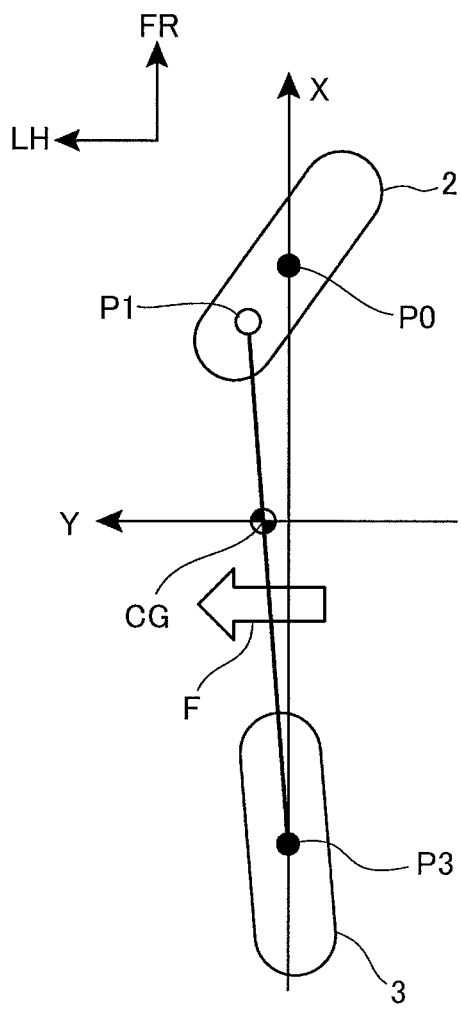

FIG. 2 is a left-hand side elevational view of the vehicle 1 where the trail length is positive. FIG. 3 is a left-hand side elevational view of the vehicle 1 where the trail length is negative. FIGS. 4A and 4B are schematic views depicting the relationship between the steering direction of the front wheel 2 and the position of the center of gravity of the vehicle 1. In FIGS. 2 and 3, the position of the center of gravity of the vehicle 1 is depicted in a lower portion of the figure. In FIGS. 2 through 4B, a longitudinal direction of the vehicle 1 is indicated by the direction X, and rolling directions of the vehicle 1, i.e., directions about the axis represented by the direction X, are indicated by the direction Y. The forward direction FR of the vehicle 1 is aligned with the direction X, whereas the leftward direction LH of the vehicle 1 is aligned with the direction Y.

FIGS. 2 and 3 depict the vehicle 1 is in a reference posture state wherein the vehicle 1 is standing up and the front wheel 2 has a steering angle of 0°.

The trail length, denoted by t, represents the distance between the point P0 of contact between the front wheel 2 and the ground and the point P1 of contact between the steering axis Cs and the ground. The trail length t is positive forwardly of the point P0 of contact and negative rearwardly of the point P0 of contact. The point P0 of contact between the front wheel 2 and the ground is positioned directly below the axle 2a. The point P3 of contact between the rear wheel 3 and the ground is positioned directly below the axle 3a of the rear wheel 3.

In FIG. 2, the point P1 of contact between the steering axis Cs and the ground is positioned forwardly of the point P0 of contact between the front wheel 2 and the ground, so that the trail length t is of a positive value. In FIG. 3, the point P1 of contact between the steering axis Cs and the ground is positioned rearwardly of the point P0 of contact between the front wheel 2 and the ground, so that the trail length t is of a negative value.

As the front fork legs 25L and 25R are tilted further rearwardly with respect to the steering axis Cs from the state depicted in FIG. 2, the point P0 of contact between the front wheel 2 and the ground is moved forwardly until the trail length t is of a negative value as depicted in FIG. 3.

The state depicted in FIG. 2 in which the trail length t is positive is referred to as a "normal state," whereas the state depicted in FIG. 3 in which the trail length t is negative is referred to as a "trail-length-changed state." In other words, when the front fork legs 25L and 25R are tilted rearwardly with respect to the vehicle body 10 from the "normal state," the vehicle 1 enters the "trail-length-changed state."

As depicted in FIGS. 2 and 3, in the reference posture state, the center CG of gravity of the vehicle 1 is positioned centrally in the transverse directions of the vehicle 1 and between the front wheel 2 and the rear wheel 3.

While the vehicle 1 is traveling, the point of contact of the front wheel 12 with the ground moves in a steered direction (a direction in which the vehicle 1 is steered) because the front wheel 2 is rolling, causing a force to be produced on the center CG of gravity in a direction opposite to the steered direction. In other words, when the vehicle 1 is steered in a direction to cause the vehicle body 10 to fall over, a force is produced in a direction to raise the vehicle body 10.

On the other hand, while the vehicle 1 is at rest, as depicted in FIG. 4A, when the front wheel 2 is steered (to the right in FIG. 4A) in the "normal state," the center G of gravity of the vehicle 1 moves in the same direction (rightward direction) as the steered direction. Therefore, providing the vehicle 1 is in the "normal state" while at rest, when the vehicle 1 is steered in a direction to cause the vehicle body 10 to fall over, a force is produced in a direction to cause the vehicle body 10 to fall over more. This direction of the force is opposite to the direction of the force produced while the vehicle 1 is traveling. In other words, the direction of a force that is produced and acts on the center CG of gravity of the vehicle 1 when the vehicle 1 is steered is reversed as the speed of the vehicle 1 varies. In this manner, since there exists a vehicle speed range wherein the direction of a force acting on the center CG of gravity is reversed while the vehicle 1 is in the "normal state," it is difficult to control falling-over of the vehicle body 10 by steering the vehicle 1, making it difficult to realize a control process for making the vehicle 1 stand on its own by steering itself.

As depicted in FIG. 4B, when the front wheel 2 is steered (to the right in FIG. 4B) in the "trail-length-changed state," the center G of gravity of the vehicle 1 moves in the opposite direction (leftward direction) to the steered direction. In the "trail-length-changed state," therefore, when the front wheel 2 is steered, the center G of gravity of the vehicle 1 moves in the opposite direction to the steered direction. As a result, when the vehicle 1 is steered in a direction to cause the vehicle body 10 to fall over, a force F is produced in a direction to raise the vehicle body 10. In other words, while the vehicle 1 is in the "trail-length-changed state," a force acting on the center CG of gravity of the vehicle 1 by steering the vehicle 1 is produced in the same direction at all times when the vehicle 1 is at rest and traveling. Consequently, it is possible to keep continuity in controlling falling-over of the vehicle body 10 by steering the vehicle 1. In the "trail-length-changed state," therefore, it is easier to realize a control process for making the vehicle 1 stand on its own by steering itself than in the "normal state."

In addition to the force F, a force produced by the movement of the point of contact of the front wheel 2 with the ground in a rolling direction of the front wheel 2 when the front wheel 2 is steered may be taken into consideration in a control process for making the vehicle 1 stand on its own.

The vehicle 1 includes a trail-length changing mechanism 30 disposed forwardly of the head pipe 17, for changing the trail length t of the front wheel 2. The structural details of the trail-length changing mechanism 30 and peripheral parts disposed therearound will be described below.

Figure 5:
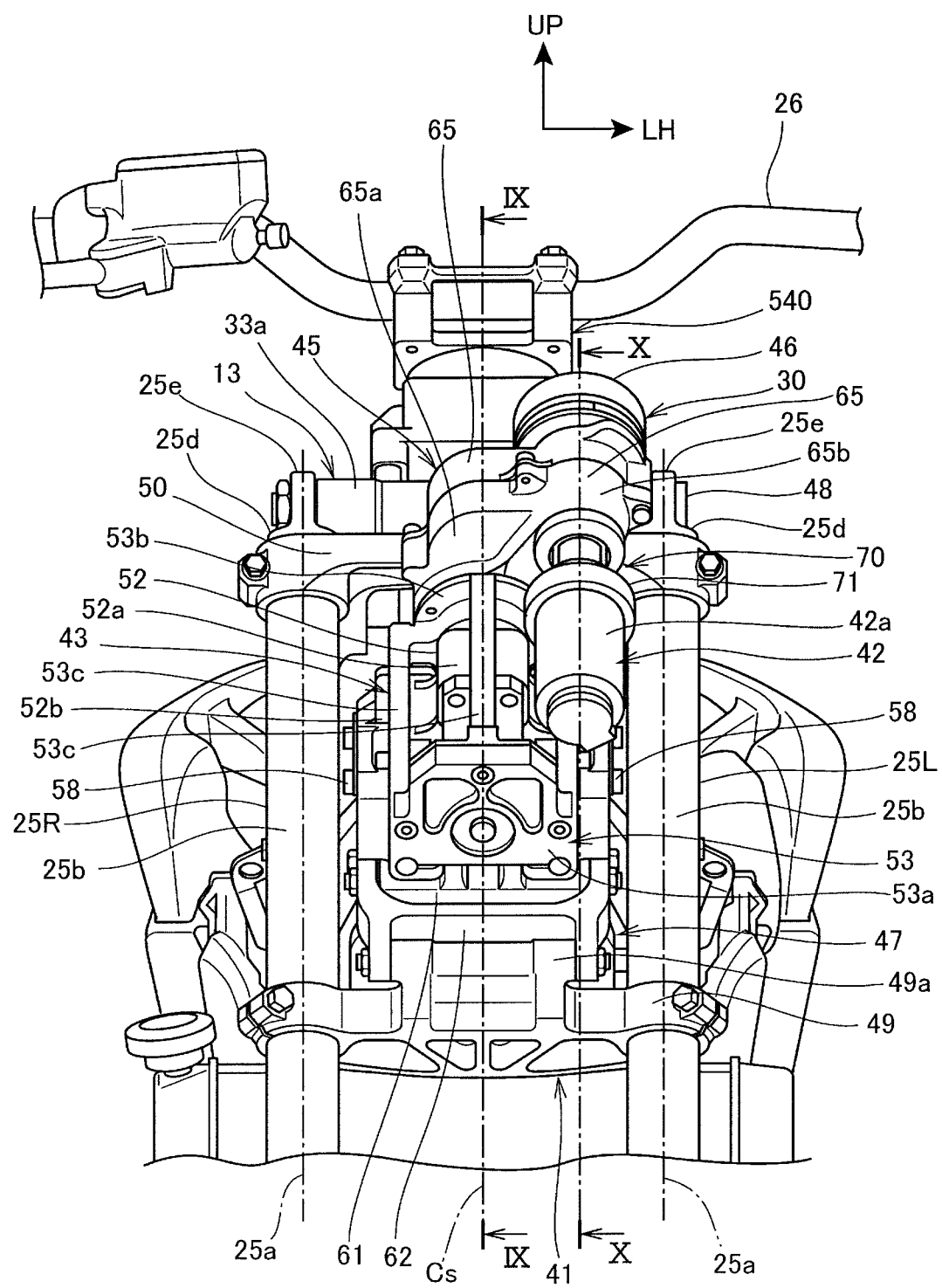
FIG. 5 is a front elevational view of a front portion of the vehicle.
Figure 6:
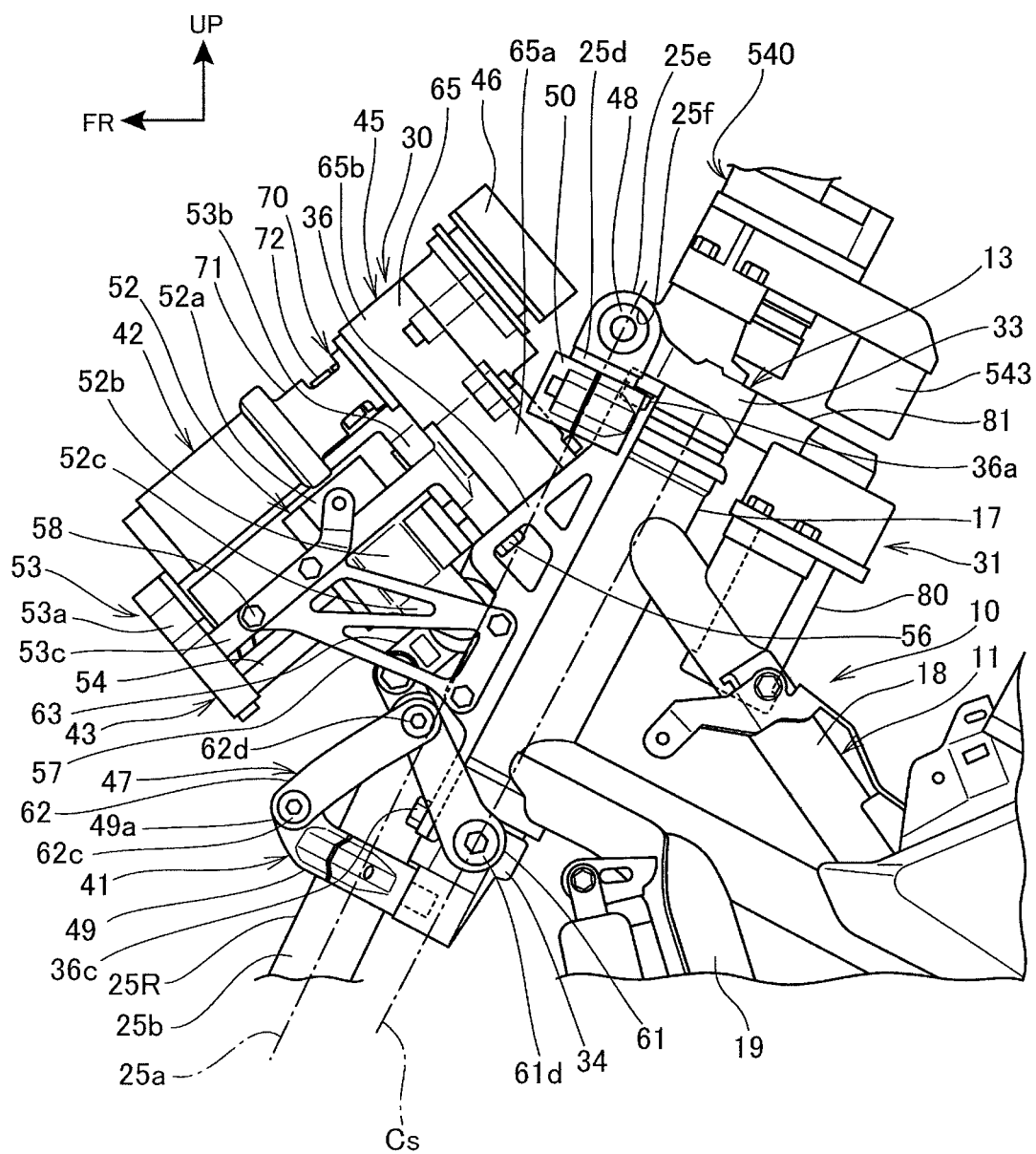
FIG. 6 is a left-hand side elevational view of the front portion of the vehicle in a "normal state."
Figure 7:
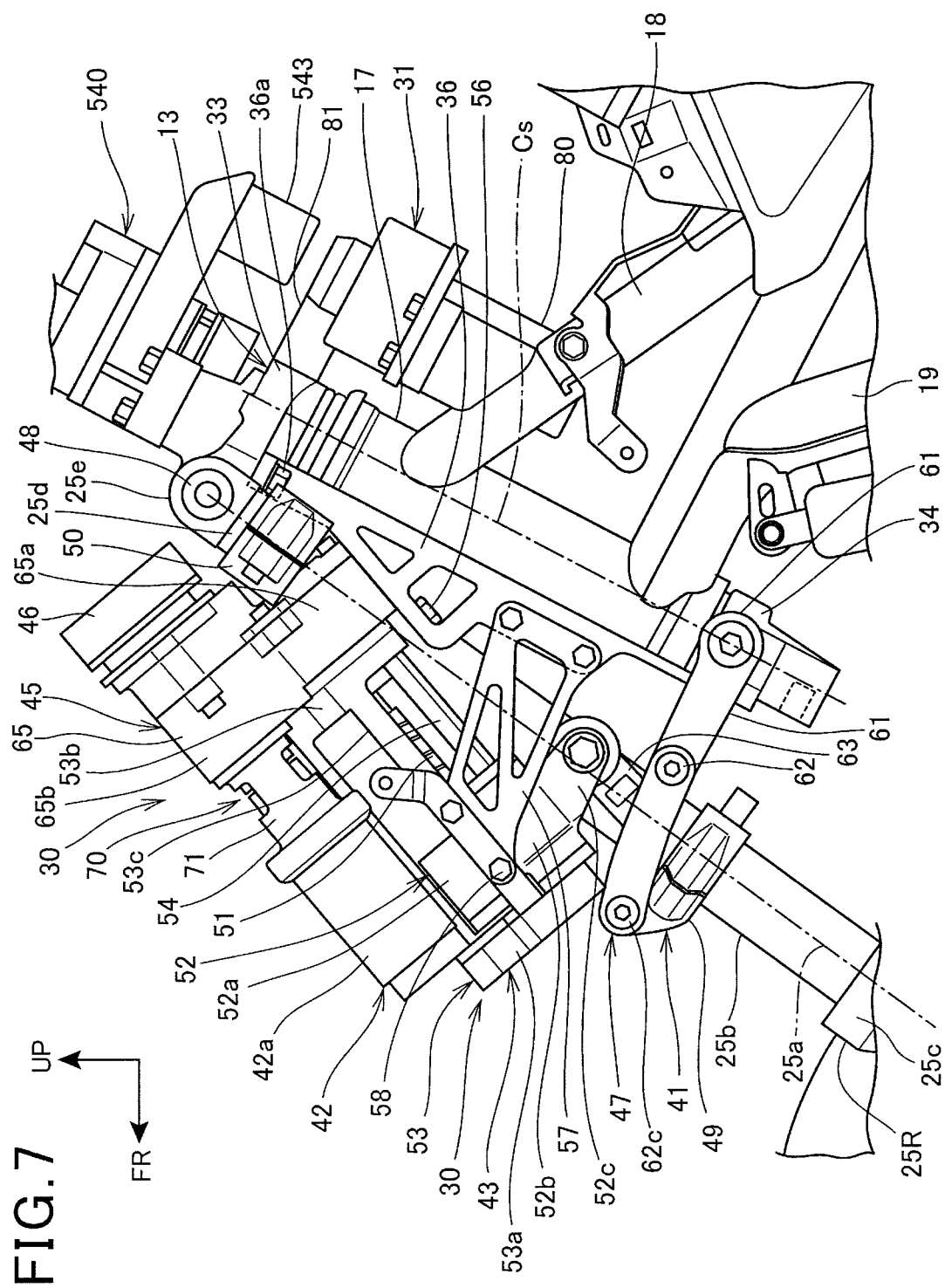
FIG. 7 is a left-hand side elevational view of the front portion of the vehicle in a "trail-length-changed state."
Figure 8:
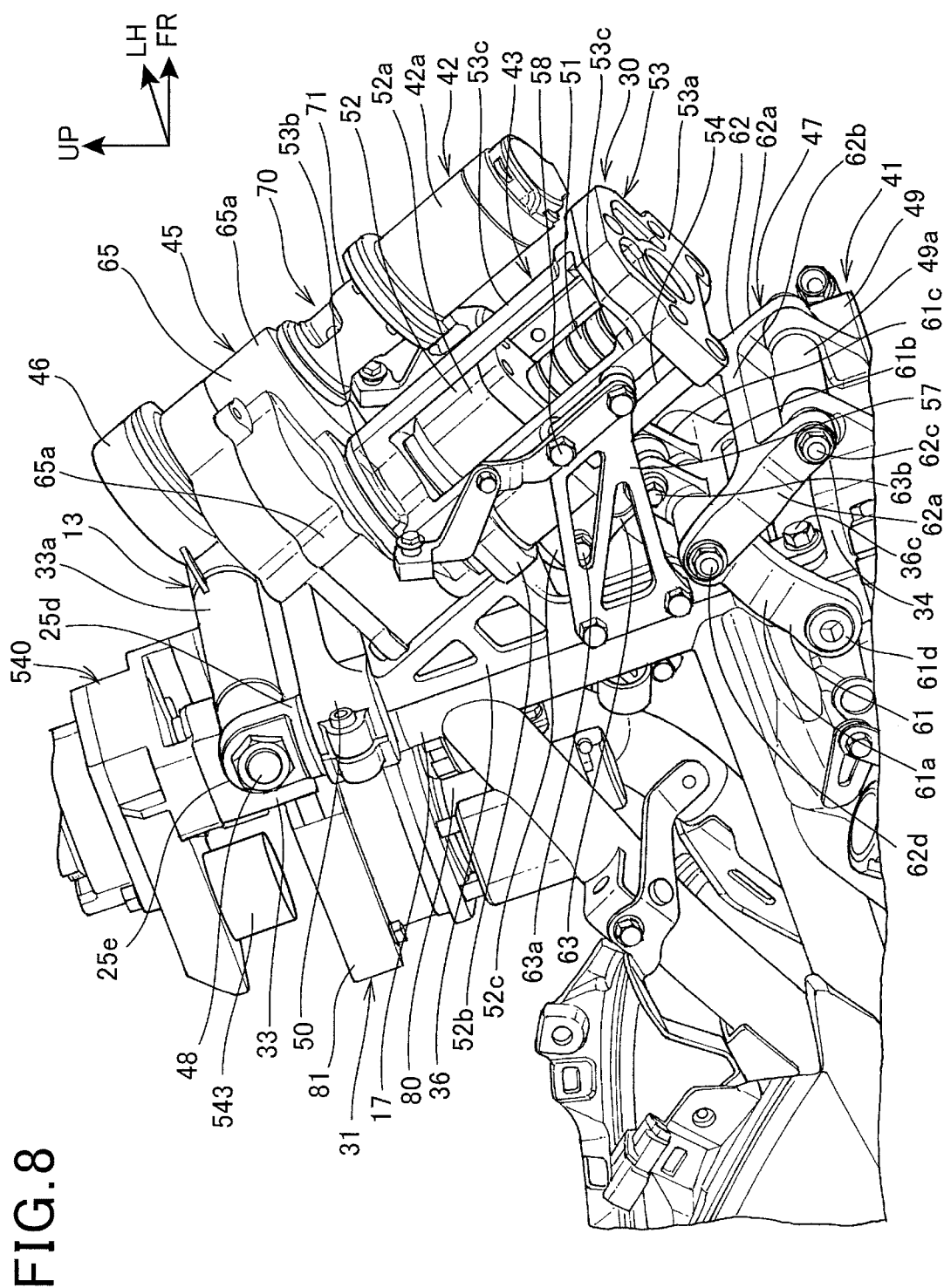
FIG. 8 is a perspective view of the front portion of the vehicle as viewed from a front right viewpoint.
Figure 9:
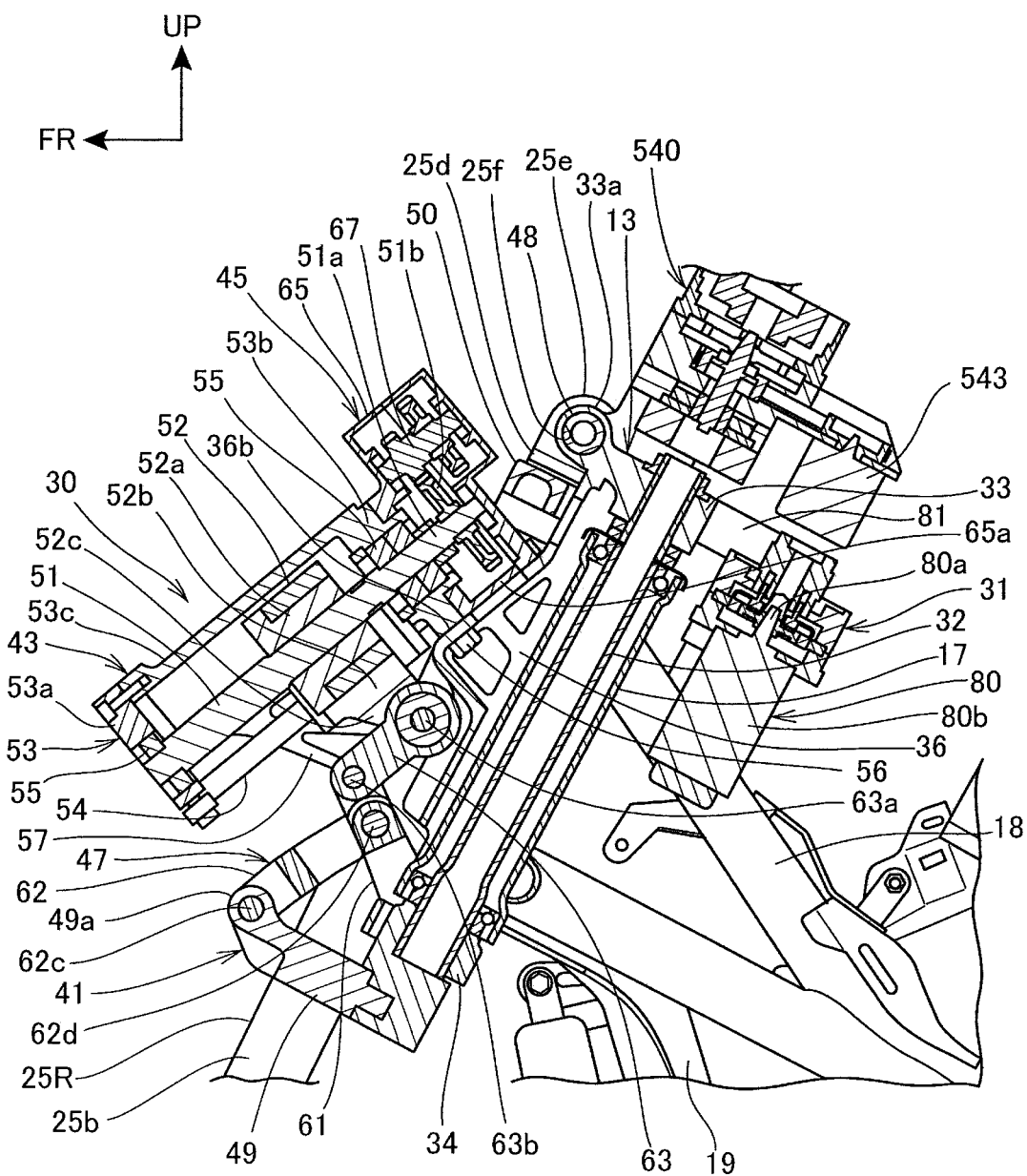
FIG. 9 is a cross-sectional view taken along line IX-IX of FIG. 5.

FIG. 5 is a front elevational view of a front portion of the vehicle 1. FIG. 6 is a left-hand side elevational view of the front portion of the vehicle 1 in the "normal state." FIG. 7 is a left-hand side elevational view of the front portion of the vehicle 1 in the "trail-length-changed state." FIG. 8 is a perspective view of the front portion of the vehicle 1 as viewed from a front right viewpoint. FIG. 9 is a cross-sectional view taken along line IX-IX of FIG. 5. In FIGS. 5 through 9, the vehicle cover 15 is omitted from illustration. In FIGS. 6 and 7, the left front fork leg 25L is omitted from illustration. In FIG. 8, the front fork legs 25L and 25R are omitted from illustration.

As depicted in FIGS. 5 through 9, the steering swivel unit 13 includes a steering shaft 32 (FIG. 9) inserted in and rotatably supported by the head pipe 17, a top bridge 33 fixed to the upper end of the steering shaft 32 that projects upwardly from the head pipe 17, and a bottom member 34 fixed to the lower end of the steering shaft 32 that projects downwardly from the head pipe 17.

The top bridge 33 is a plate-like member extending in the transverse directions of the vehicle 1 above the head pipe 17, with a bar-like steering handle 26 provided above the top bridge 33. The steering shaft 32 has a central axis aligned with the steering axis Cs. The steering shaft 32, the top bridge 33, and the bottom member 34 of the steering swivel unit 13 are angularly movable about the steering axis Cs.

A bracket 36 is mounted on the steering swivel unit 13. The bracket 36 is disposed between the left and right front fork legs 25L and 25R and forwardly of the head pipe 17, and extends vertically along the head pipe 17, joining the top bridge 33 and the bottom member 34 to each other. The bracket 36 has an upper end fixed to a lower surface of the top bridge 33 by a bolt 36a (FIG. 7). The bracket 36 has a lower end fixed to a front surface of the bottom member 34 by a bolt 36c (FIGS. 6, 8). The bracket 36 is angularly movable in unison with the steering swivel unit 13.

The trail-length changing mechanism 30 includes a swing assembly 41 coupled to the steering swivel unit 13 and swingable in forward and rearward directions, an electric motor 42 for supplying drive power to actuate the swing assembly 41, and a ball screw mechanism 43 (screw mechanism) for converting rotation of the electric motor 42 into linear motion that is transmitted to cause the swing assembly 41 to swing.

The trail-length changing mechanism 30 also includes a speed reducer 45 for transmitting rotation of the electric motor 42 at a reduced ratio to the ball screw mechanism 43, a lock mechanism 46 for limiting the electric motor 42 against rotation, and a link mechanism 47 that couples the ball screw mechanism 43 to the swing assembly 41 and the steering swivel unit 13.

The swing assembly 41 of the trail-length changing mechanism 30 includes a swing shaft 48 extending in the transverse directions of the vehicle 1 and coupling the front fork legs 25L and 25R swingably to the steering swivel unit 13, and a bottom bridge 49 (bridge member) coupling the front fork legs 25L and 25R to each other and coupled to the link mechanism 47.

The front fork legs 25L and 25R are also coupled to each other in the transverse directions of the vehicle 1 by a coupling member 50 disposed above the bottom bridge 49.

In the "normal state" depicted in FIG. 6, each of the front fork legs 25L and 25R has its fork leg axis 25a (axis) extending in axial directions thereof and disposed forwardly of the head pipe 17 substantially parallel to the steering axis Cs.

Each of the front fork legs 25L and 25R includes a fixed tube 25b supported on the bottom bridge 49, a movable tube 25c (FIG. 1) axially telescopically combined with the fixed tube 25b, and a fork leg cap 25d.

The front fork legs 25L and 25R include an electronically controlled suspension capable of automatically changing their length along the fork leg axes 25a. The length of the front fork legs 25L and 25R can be changed by changing the preload of suspension springs disposed in the front fork legs 25L and 25R with actuators 25g (FIG. 11) provided in the respective front fork legs 25L and 25R.

The fixed tubes 25b and the movable tubes 25c house suspension springs, oil, etc. incorporated therein. The fork leg caps 25d close openings defined in upper surfaces of the fixed tubes 25b. Specifically, the fork leg caps 25d are fastened to respective upper end portions of the fixed tubes 25b by having externally threaded outer peripheral surfaces thereof held in threaded engagement with respective internally threaded inner peripheral surfaces of the upper end portions of the fixed tubes 25b.

The coupling member 50 couples the upper end portions of the fixed tubes 25b laterally to each other, and the bottom bridge 49 couples respective lower portions of the fixed tubes 25b laterally to each other.

Each of the fork leg caps 25d has an extension 25e extending upwardly beyond the upper end of the fixed tube 25b. The extension 25e has a swing shaft insertion hole 25f defined therein which extends therethrough in the transverse directions of the vehicle 1.

The top bridge 33 of the steering swivel unit 13 has a tubular swing shaft support 33a on a front end thereof that extends forwardly of the head pipe 17, the tubular swing shaft support 33a extending in the transverse directions of the vehicle 1. The swing shaft 48 is coupled to the top bridge 33 by being inserted through the tubular swing shaft support 33a.

The swing shaft insertion holes 25f of the respective fork leg caps 25d are fitted respectively over the opposite ends of the swing shaft 48 that project from the tubular swing shaft 33a in the transverse directions of the vehicle 1, so that the front fork legs 25L and 25R are swingably supported on the swing shaft 48.

Specifically, when the vehicle 1 is viewed in side elevation, the swing shaft 48 is positioned on the fork leg axes 25a and disposed in alignment with the fork leg axes 25a.

In other words, the front fork legs 25L and 25R are coupled to the top bridge 33 by the swing shaft 48 that is provided on their upper ends, and are swingable in the forward and rearward directions, i.e., the longitudinal directions, of the vehicle 1 about the central axis of the swing shaft 48 positioned on the fork leg axes 25a.

The bottom bridge 49 of the swing assembly 41 has a tubular swing-assembly-side link joint 49a extending in the transverse directions of the vehicle 1 and provided on the front end of a central portion thereof in the transverse directions of the vehicle 1. The link mechanism 47 has a front end joined to the tubular swing-assembly-side link joint 49a.

When the link mechanism 47 is operated from the "normal state" depicted in FIG. 6, the bottom bridge 49 is moved forwardly, and the front fork legs 25L and 25R are swung about the swing shaft 48, as depicted in FIG. 7. Details of the link mechanism 47 will be described later.

According to the first embodiment, the front fork legs 25L and 25R are angularly movable with the front wheel 2 about the steering axis Cs, and also swingable with the front wheel 2 forwardly and rearwardly about the swing axis 48.

The ball screw mechanism 43 includes a screw shaft 51, a nut member 52 threaded over the screw shaft 51, a housing 53 supporting the screw shaft 51 housed therein, and a guide member 54 extending parallel to the screw shaft 51.

The housing 53 has a lower wall 53a supporting one end (lower end) of the screw shaft 51, an upper wall 53b supporting the other end (upper end) of the housing 53, and a plurality of joints 53c vertically interconnecting the peripheral edge of the lower wall 53a and the peripheral edge of the upper wall 53b.

The lower wall 53a and the upper wall 53b are each formed as a plate lying perpendicularly to the screw shaft 51. The screw shaft 51 is rotatably supported on the lower wall 53a and the upper wall 53b by respective bearings 55 disposed centrally in the lower wall 53a and the upper wall 53b. The joints 53c extend substantially parallel to the screw shaft 51.

The guide member 54 is formed as a shaft interconnecting the lower wall 53a and the upper wall 53b, and disposed behind the screw shaft 51.

The nut member 52 includes a nut 52a threaded over the screw shaft 51 and a movable block 52b movably mounted on the guide member 54 integrally with the nut 52a. The movable block 52b includes a screw-mechanism-side link joint 52c extending out of the housing 53 toward the head pipe 17 which is disposed behind the ball screw mechanism 43.

The other end, denoted by 51a in FIG. 9, of the screw shaft 51 extends upwardly through the upper wall 53b, with an input gear 51b provided on the other end 51a.

The ball screw mechanism 43 is disposed in such a posture that the screw shaft 51 is inclined rearwardly from the vertical directions, as viewed in side elevation. The screw shaft 51 is inclined rearwardly at a larger angle than the steering axis Cs.

The bracket 36 has a mount surface 36b on its front side that is inclined rearwardly at a larger angle than the steering axis Cs. The housing 53 of the ball screw mechanism 43 has an upper rear surface held against the mount surface 36b. The ball screw mechanism 43 is firmly fastened to the mount surface 36b by a bolt 56 that is inserted from behind through the mount surface 36b and the housing 53.

Support pieces 57 that extend forwardly are mounted respectively on left and right side surfaces of a lower portion of the bracket 36.

The ball screw mechanism 43 is fixed to the support pieces 57 by bolts 58 that are inserted from outside to front end portions of the support pieces 57 in the transverse directions of the vehicle 1 and fastened to the joints 53c.

The ball screw mechanism 43 that is secured to the steering swivel unit 13 by the bracket 36 is angularly movable in unison with the steering swivel unit 13 in the direction in which the front wheel 2 is steered.

The ball screw mechanism 43 is positioned forwardly of the steering swivel unit 13, and is disposed between the left and right front fork legs 25L and 25R as viewed in front elevation in FIG. 5. The screw shaft 51 is positioned centrally in the transverse directions of the vehicle 1 as is the case with the steering axis Cs, and extends vertically. The ball screw mechanism 43 is disposed vertically between the swing shaft 48 and the bottom bridge 49.

The link mechanism 47 includes a first link 61 extending forwardly from the bottom member 34, a second link 62 extending rearwardly from the bottom bridge 49 and coupled to a front portion of the first link 61, and a third link 63 interconnecting the first link 61 and the movable block 52b of the ball screw mechanism 43.

Specifically, as depicted in FIG. 8, the first link 61 includes a pair of left and right arms 61a extending forwardly from respective left and right side surfaces of the bottom member 34, a tubular member 61b interconnecting the distal ends of the arms 61a in the transverse directions of the vehicle 1, and a joint 61c projecting forwardly from a central portion of the tubular member 61b.

The first link 61 is angularly movably mounted on the bottom member 34 by a joint shaft 61d that extends in the transverse directions of the vehicle 1.

As depicted in FIG. 8, the second link 62 includes a pair of left and right arms 62a extending rearwardly over the bottom bridge 49 from the respective left and right ends of the tubular swing-assembly-side link joint 49a of the bottom bridge 49, and a cross member 62b interconnecting the arms 62 in the transverse directions of the vehicle 1.

The second link 62 is angularly movably mounted on the tubular swing-assembly-side link joint 49a by a joint shaft 62c that extends in the transverse directions of the vehicle 1.

The arms 62a of the second link 62 have respective distal ends overlapping the tubular member 61b of the first link 61 from outside in the transverse directions of the vehicle 1. The distal ends of the arms 62a are angularly movably mounted on the first link 61 by a joint shaft 62d that is inserted through the distal ends of the arms 62a and the tubular member 61b.

The third link 63 has an upper end angularly movably mounted on the screw-mechanism-side link joint 52c by a joint shaft 63a that extends in the transverse directions of the vehicle 1. The third link 63 has a lower end angularly movably mounted on the joint 61c of the first link 61 by a joint shaft 63b that extends in the transverse directions of the vehicle 1.

Figure 10:
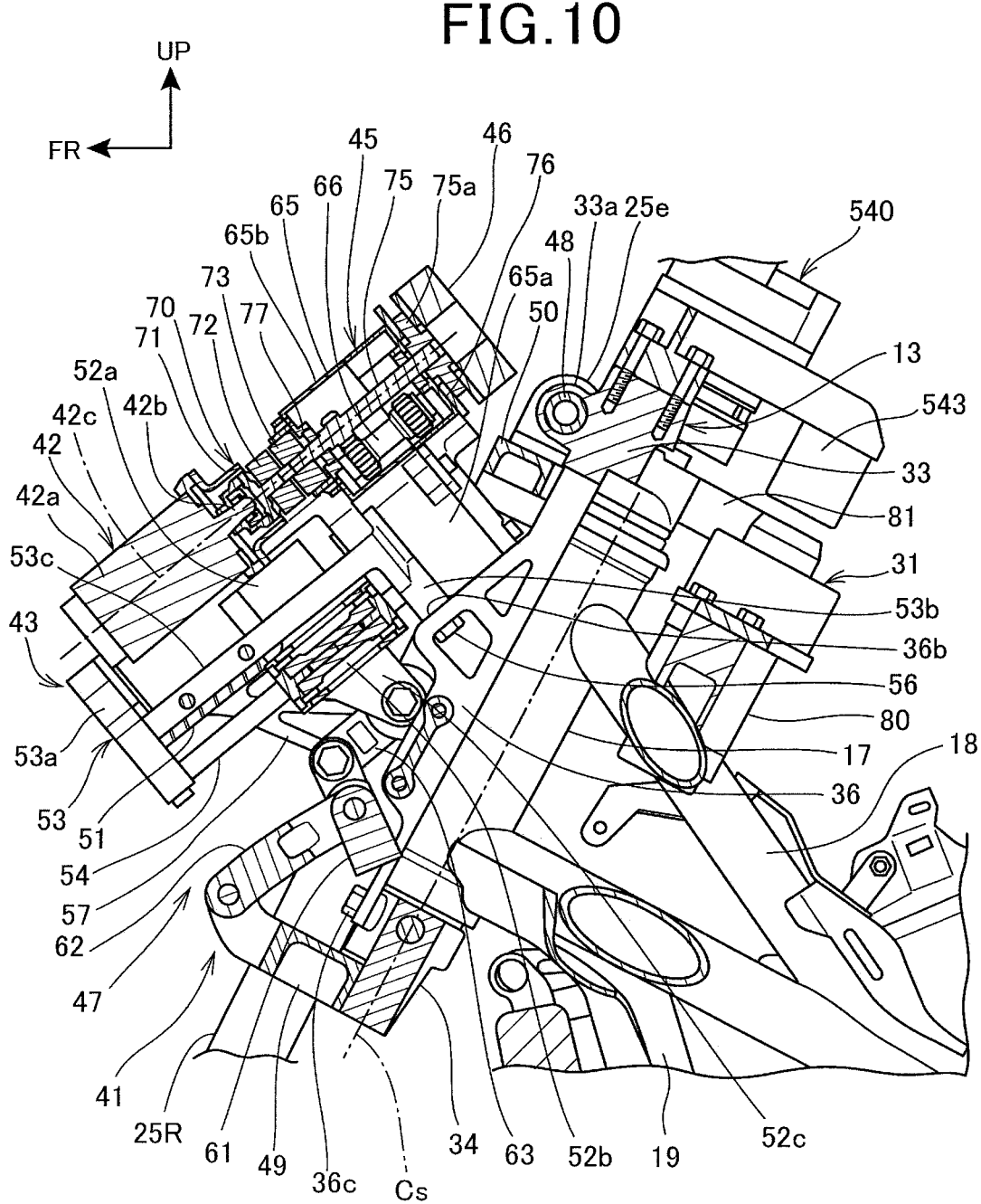
FIG. 10 is a cross-sectional view taken along line X-X of FIG. 5.

FIG. 10 is a cross-sectional view taken along line X-X of FIG. 5.

As depicted in FIGS. 5 through 10, the speed reducer 45 includes a box-shaped speed reducer case 65 and a first transmission shaft 66 and a second transmission shaft 67 that are supported by and housed in the speed reducer case 65.

The speed reducer 45 is mounted on an upper surface of the ball screw mechanism 43. Specifically, the speed reducer case 65 of the speed reducer 45 has a lower surface fixed to an upper wall 53b of the ball screw mechanism 43. In other words, the speed reducer 45 is supported on the bracket 36 by the ball screw mechanism 43.

As viewed in side elevation in FIG. 6, etc., the speed reducer case 65 extends forwardly and upwardly along the upper wall 53b.

The speed reducer case 65 includes a screw-mechanism-side case member 65a fixed to the upper wall 53b of the ball screw mechanism 43 and a motor-side case member 65b extending forwardly and outwardly in a transverse direction of the vehicle 1 from the screw-mechanism-side case member 65a, the case members 65a, 65b being integral with each other.

The first transmission shaft 66 is held in mesh with the second transmission shaft 67 through intermeshing gears. The first transmission shaft 66 and the second transmission shaft 67 are disposed parallel to the screw shaft 51 of the ball screw mechanism 43, and are inclined rearwardly. The second transmission shaft 67 has a gear held in mesh with the input gear 51b provided on the other end 51a of the screw shaft 51 of the ball screw mechanism 43. The other end 51a of the screw shaft 51 and the input gear 51b are housed in the screw-mechanism-side case member 65a.

The electric motor 42 is mounted on the speed reducer 45 by a coupling unit 70 serving as a shaft coupling.

The coupling unit 70 includes a tubular case 71 and a drive coupling member 72 and a driven coupling member 73 that are housed in the case 71.

The case 71 has an upper end fixed to a lower surface of the motor-side case member 65b, and extends substantially parallel to the screw shaft 51.

The electric motor 42 includes a motor body 42a housing a rotor, etc. therein and a rotational shaft 42b as the output shaft of the electric motor 42. The electric motor 42 is shaped as a column that is elongate along a central axis 42c of the rotational shaft 42b.

The electric motor 42 is disposed such that the rotational shaft 42b enters the case 71 from below and the motor body 42a is fixed to the lower end of the case 71. In other words, the electric motor 42 is attached to the steering swivel unit 13 on the vehicle body 10 through the coupling unit 70, the speed reducer case 65, the ball screw mechanism 43, and the bracket 36.

With the electric motor 42 fixed to the case 71, the axis 42c of the rotational shaft 42b lies parallel to the screw shaft 51 of the ball screw mechanism 43. As viewed in side elevation in FIG. 10, the axis 42c is oriented in the vertical directions of the vehicle 1 in a posture inclined rearwardly from the vertical directions at a larger angle than the steering axis Cs.

The electric motor 42 that is provided as suspended downwardly from the motor-side case member 65b is disposed in a position offset forwardly from the ball screw mechanism 43 and laterally from the ball screw mechanism 43. As viewed in front elevation in FIG. 5, the electric motor 42 is positioned between the left and right front fork legs 25L and 25R.

The drive coupling member 72 and the driven coupling member 73 connect the rotational shaft 42b of the electric motor 42 to an input shaft 75 (FIG. 10) housed in the motor-side case member 65b of the speed reducer 45.

The input shaft 75 is coaxial with the axis 42c of the rotational shaft 42b of the electric motor 42, and lies parallel to the rotational shaft 42b and the screw shaft 51.

The input shaft 75 is held in mesh with the first transmission shaft 66 of the speed reducer 45 through intermeshing gears. The input shaft 75 has an upper end supported on an upper wall 76 of the motor-side case 65b by a bearing, and a lower end supported on a lower wall 77 of the motor-side case 65b by a bearing.

The input shaft 75 has a lower end projecting downwardly from the motor-side case member 65b and connected to the driven coupling member 73.

The drive coupling member 72 is connected to the upper end of the rotational shaft 42b of the electric motor 42. The drive coupling member 72 is connected to the driven coupling member 73.

The lock mechanism 46 includes an electromagnetic clutch disposed coaxially with the axis 42c of the rotational shaft 42b.

The input shaft 75 has on its upper end a lock member 75a (FIG. 10) positioned over the upper wall 76 of the motor-side case member 65b. The lock mechanism 46 is mounted on an upper surface of the upper wall 76 of the motor-side case member 65b.

When an electromagnet of the lock mechanism 46 is not energized, its plunger is biased by a biasing member into engagement with the lock member 75a of the input shaft 75, preventing the input shaft 75 from rotating about its own axis. When the electromagnet of the lock mechanism 46 is energized, the plunger is actuated by magnetic forces of the electromagnet out of engagement with the lock member 75a of the input shaft 75 against the bias of the biasing member, allowing the input shaft 75 to rotate about its own axis.

In other words, when the electromagnet of the lock mechanism 46 is de-energized, the input shaft 75 is not rotatable about its own axis, making the rotational shaft 42b of the electric motor 42 non-rotatable. When the electromagnet of the lock mechanism 46 is energized, the input shaft 75 is rotatable about its own axis, making the rotational shaft 42b of the electric motor 42 rotatable.

The vehicle 1 is provided with an automatic steering mechanism 31 (steering mechanism) for actuating the steering swivel unit 13 to steer the front wheel 2.

The automatic steering mechanism 31 includes a steering motor 80 (drive source) as a steering drive source and a steering link 81 (link) as a drive power transmitting member for transmitting drive power from the steering motor 80 to the steering swivel unit 13.

The steering motor 80 is supported on the main frame 18 behind the head pipe 17.

The steering link 81 extends forwardly from a rotational shaft 80a of the steering motor 80 alongside the head pipe 17, and is coupled to the top bridge 33 of the steering swivel unit 13.

Figure 11:
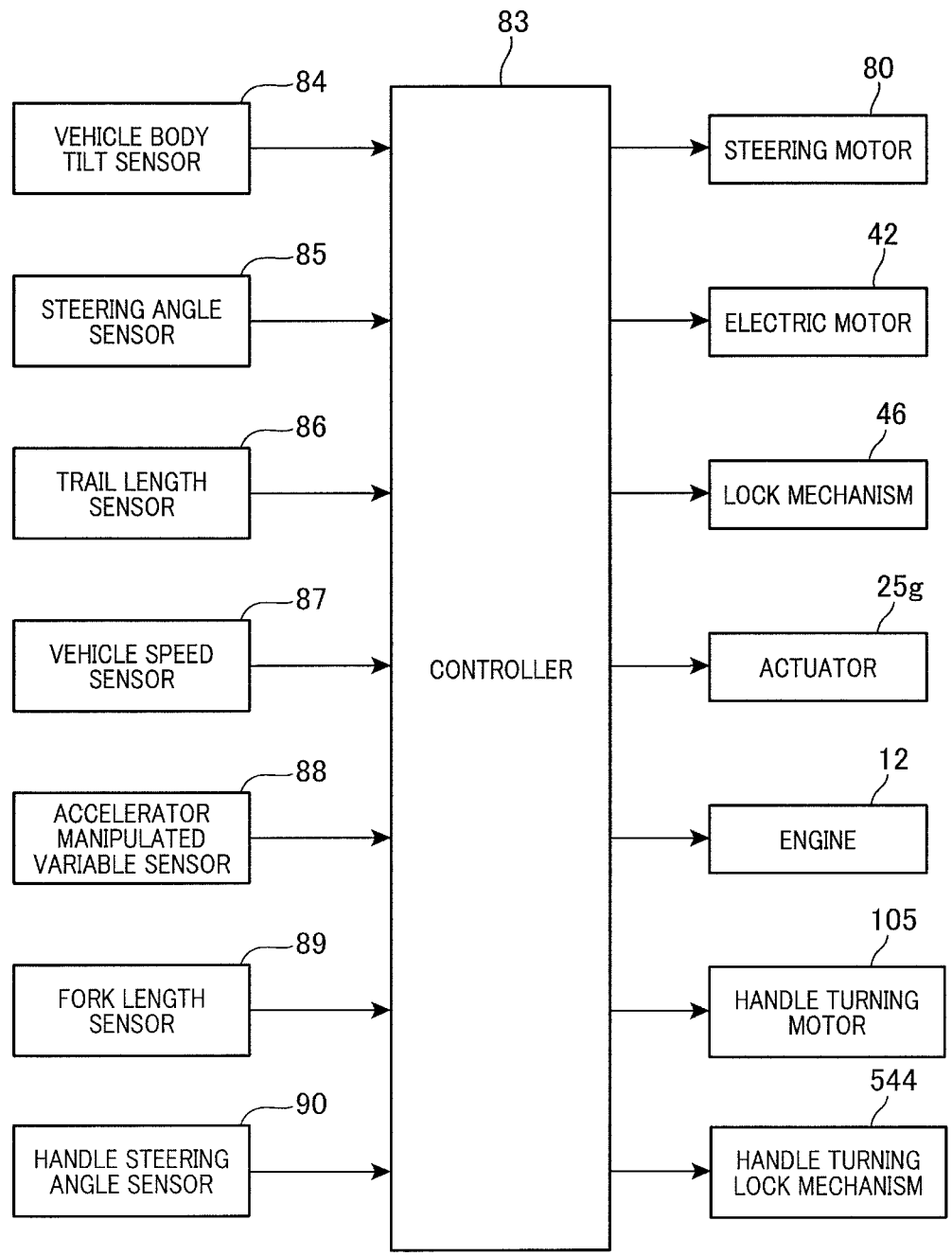
FIG. 11 is a block diagram depicting an arrangement for controlling the vehicle.

FIG. 11 is a block diagram depicting an arrangement for controlling the vehicle 1.

As depicted in FIG. 11, the vehicle 1 includes a controller 83 for performing a control process for controlling operation of the steering motor 80, the electric motor 42 of the trail-length changing mechanism 30, the lock mechanism 46, the actuators 25g provided in the respective front fork legs 25L and 25R, the engine 12, a handle turning motor 105 to be described later, and a handle turning lock mechanism 544 (lock mechanism) to be described later.

The vehicle 1 also has sensors for detecting various state quantities required for the control process performed by the controller 83. These sensors include a vehicle body tilt sensor 84 for detecting a tilt angle of the vehicle body 10 in the rolling directions thereof, a steering angle sensor 85 for detecting a steering angle of the front wheel 2 about the steering axis Cs, a trail length sensor 86 for detecting the trail length t, a vehicle speed sensor 87 for detecting a speed at which the vehicle 1 travels, an accelerator manipulated variable sensor 88 for detecting a manipulated variable of an accelerator grip on the steering handle 26, a fork length sensor 89 for detecting an axial length of the front fork legs 25L and 25R, and a handle steering angle sensor 90 for detecting a steering angle of the steering handle 26.

The controller 83 includes an electronic circuit unit including a CPU, a RAM, a ROM, and an interface circuit, etc., and is mounted on the vehicle 1. The sensors 84 through 90 referred to above are connected to the controller 83, and supply their output signals (detected signals) to the controller 83.

The controller 83 controls the engine 12 to operate to propel the vehicle 1 on the basis of an output signal from the accelerator manipulated variable sensor 88.

When the electric motor 42 is energized by the controller 83, the trail-length changing mechanism 30 operates to change the trail length t.

Specifically, the rotation of the rotational shaft 42b of the electric motor 42 is transmitted therefrom successively through the drive coupling member 72 and the driven coupling member 73, the input shaft 75, the first transmission shaft 66 and the second transmission shaft 67 of the speed reducer 45, and the input gear 51b to the screw shaft 51 of the ball screw mechanism 43.

At this time, the rotation of the electric motor 42 is largely reduced in speed by the speed reducer 45 before being transmitted to the screw shaft 51.

The screw shaft 51 is thus rotated about its own axis by the electric motor 42, causing the nut member 52 to move linearly on the screw shaft 51 along the guide member 54.

The movement of the nut member 52 on the screw shaft 51 deforms the link mechanism 47, causing the bottom bridge 49 coupled to the second link 62 to move in a longitudinal direction of the vehicle 1.

When the bottom bridge 49 is moved in the longitudinal direction of the vehicle 1, the front fork legs 25L and 25R are turned in the longitudinal direction of the vehicle 1 about the swing shaft 48, thereby changing the trail length t.

In the "normal state" depicted in FIG. 6, the nut member 52 has been displaced upwardly in abutment against the upper wall 53b of the housing 53 by energizing the electric motor 42. The joint shaft 62d of the second link 62 has been lifted upwardly, rearwardly displacing the joint shaft 62c at the front end of the second link 62 to cause the bottom bridge 49 to turn the front fork legs 25L and 25R rearwardly. The "normal state" is a state where the trail length t is set to have the front wheel 2 in its rearmost position.

In the "normal state," the bottom bridge 49 has its rear surface held in abutment against the front surface of the bottom member 34 thereby to prevent the front fork legs 25L and 25R from swinging further rearwardly.

In the "normal state," moreover, the controller 83 does not energize the lock mechanism 46, which locks the rotational shaft 42b of the electric motor 42 against rotation. Therefore, the lock mechanism 46 also locks the nut member 52 against movement on the screw shaft 51, thereby locking the front fork legs 25L and 25R against swinging movement. Consequently, the front fork legs 25L and 25R are prevented from changing from the "normal state" to the "trail-length-changed state" under external forces applied from the road, etc. to the vehicle 1.

If rotation is transmitted from the ball screw mechanism 43 via the speed reducer 45 to the electric motor 42, then the rotation is accelerated by the speed reducer 45, and hence the torque from the ball screw mechanism 43 is reduced by the speed reducer 45 before being transmitted to the input shaft 75.

According to the first embodiment, with respect to the path along which the rotation is transmitted from the electric motor 42, the lock mechanism 46 is disposed on the input shaft 75 upstream of the first transmission shaft 66 of the speed reducer 45. With this layout, even if the nut member 52 is to move downwardly from the "normal state," the torque that is transmitted from the ball screw mechanism 43 to the input shaft 75 is small. Therefore, the lock mechanism 46 is able to prevent the front fork legs 25L and 25R from swinging with a reduced locking capability.

In the "trail-length-changed state" depicted in FIG. 7, the nut member 52 has been displaced downwardly in abutment against the lower wall 53a of the housing 53 by energizing the electric motor 42. The joint shaft 62d of the second link 62 has been lowered downwardly, forwardly displacing the joint shaft 62c at the front end of the second link 62 to cause the bottom bridge 49 to turn the front fork legs 25L and 25R forwardly.

In the "trail-length changed state," moreover, the controller 83 does not energize the lock mechanism 46, which locks the rotational shaft 42b of the electric motor 42 against rotation. Therefore, the lock mechanism 46 also locks the nut member 52 against movement on the screw shaft 51, thereby locking the front fork legs 25L and 25R against swinging movement. Consequently, the front fork legs 25L and 25R are prevented from changing from the "trail-length-changed state" to the "normal state" under external forces applied from the road, etc. to the vehicle 1.

According to the first embodiment, the electric motor 42 is supported on the steering swivel unit 13 on the vehicle body 10 through the speed reducer 45, the ball screw mechanism 43, and the bracket 36. Therefore, the electric motor 42 can be located in the vicinity of the steering axis Cs. The steering inertia of the steering swivel unit 13 is thus lowered, making it easy for the steering swivel unit 13 to steer the front wheel 2.

The front fork legs 25L and 25R are swingable about the steering shaft 48 that is disposed in a position aligned with the fork leg axis 25a as viewed in side elevation. Therefore, the inertial mass of the front fork legs 25L and 25R at the time they swing is reduced. Consequently, the front fork legs 25L and 25R can swing under small drive forces and rapidly to change the trail length t quickly.

An example of operation of the trail-length changing mechanism 30, the automatic steering mechanism 31, and the front fork legs 25L and 25R will be described below.

If the vehicle speed detected by the vehicle speed sensor 87 is in excess of a predetermined speed (e.g., 4 kilometers per hour), the controller 83 keeps the vehicle 1 in the "normal state." While the vehicle 1 is traveling in the "normal state," the controller 83 does not energize the lock mechanism 46, thereby locking the front fork legs 25L and 25R against swinging movement. In the "normal state," the controller 83 reduces the controlled variable for the steering motor 80 of the automatic steering mechanism 31. In the "normal state," therefore, the rider steers the front wheel 2 through the steering handle 26.

If the vehicle speed detected by the vehicle speed sensor 87 is equal to or lower than a predetermined speed (e.g., 3 kilometers per hour) including an at-rest state (0 kilometer per hour), then the controller 83 brings the vehicle 1 into the "trail-length-changed state."

Initially, the controller 83 actuates the lock mechanism 46 while in the "normal state" to unlock the front fork legs 25L and 25R for swinging movement. Then, the controller 83 energizes the electric motor 42 to turn the front fork legs 25L and 25R forwardly about the swing shaft 48, bringing the vehicle 1 into the "trail-length-changed state." Thereafter, the controller 83 stops energizing the lock mechanism 46, preventing the front fork legs 25L and 25R from swinging.

In the "trail-length-changed state," the controller 83 increases the controlled variable for the steering motor 80 and steers the front wheel 2. Specifically, based on output signals from the vehicle body tilt sensor 84 and the steering angle sensor 85, the controller 83 energizes the steering motor 80 so that the vehicle 1 can stand on its own in an upright state, i.e., the tilt angle detected by the vehicle body tilt sensor 84 is zero. In the "trail-length-changed state," as described above, when the front wheel 2 is steered, the center CG of gravity moves in the opposite direction to the steered direction, producing a force F (FIG. 4B) in a direction to keep the vehicle body 10 upright. By energizing the steering motor 80 in a direction to steer the vehicle 1 in the direction to cause the vehicle body 10 to fall over, the controller 83 is able to make the vehicle 1 stand on its own.

In the "trail-length-changed state," therefore, as the vehicle 1 stands on its own under the control of the controller 83, the vehicle 1 keeps itself upright without being supported by a stand or the rider even when the vehicle 1 is at rest.

In the "trail-length-changed state" and the "normal state," the controller 83 operates the actuators 25g of the front fork legs 25L and 25R on the basis of an output signal from the fork length sensor 89 to adjust the axial lengths of the front fork legs 25L and 25R in order to reduce changes in the height of the vehicle 1.

Specifically, when the vehicle 1 changes from the "normal state" to the "trail-length-changed state," the height of the vehicle 1 is lowered because the front fork legs 25L and 25R are tilted further rearwardly. Therefore, even when the vehicle 1 changes to the "trail-length-changed state," in order to keep the same height of the vehicle 1 as in the "normal state," the controller 83 operates the actuators 25g to increase the overall lengths of the front fork legs 25L and 25R. In this manner, any change in the maneuverability of the vehicle 1 due to a change in the trail length t is minimized.

The automatic steering mechanism 31 will be described in detail below.

Figure 12:
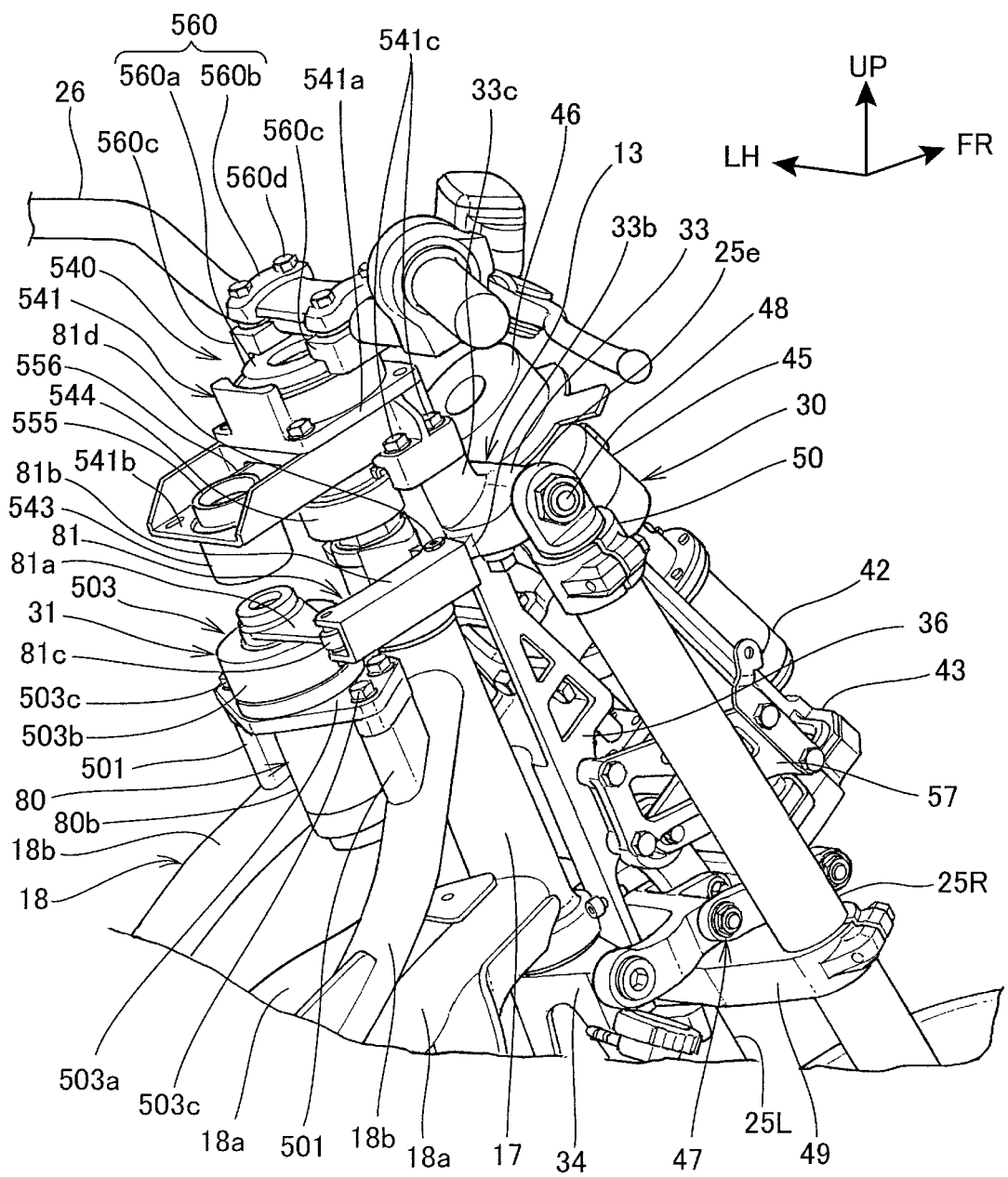
FIG. 12 is a perspective view of a steering swivel unit and peripheral parts as viewed from a rear right viewpoint.
Figure 13:
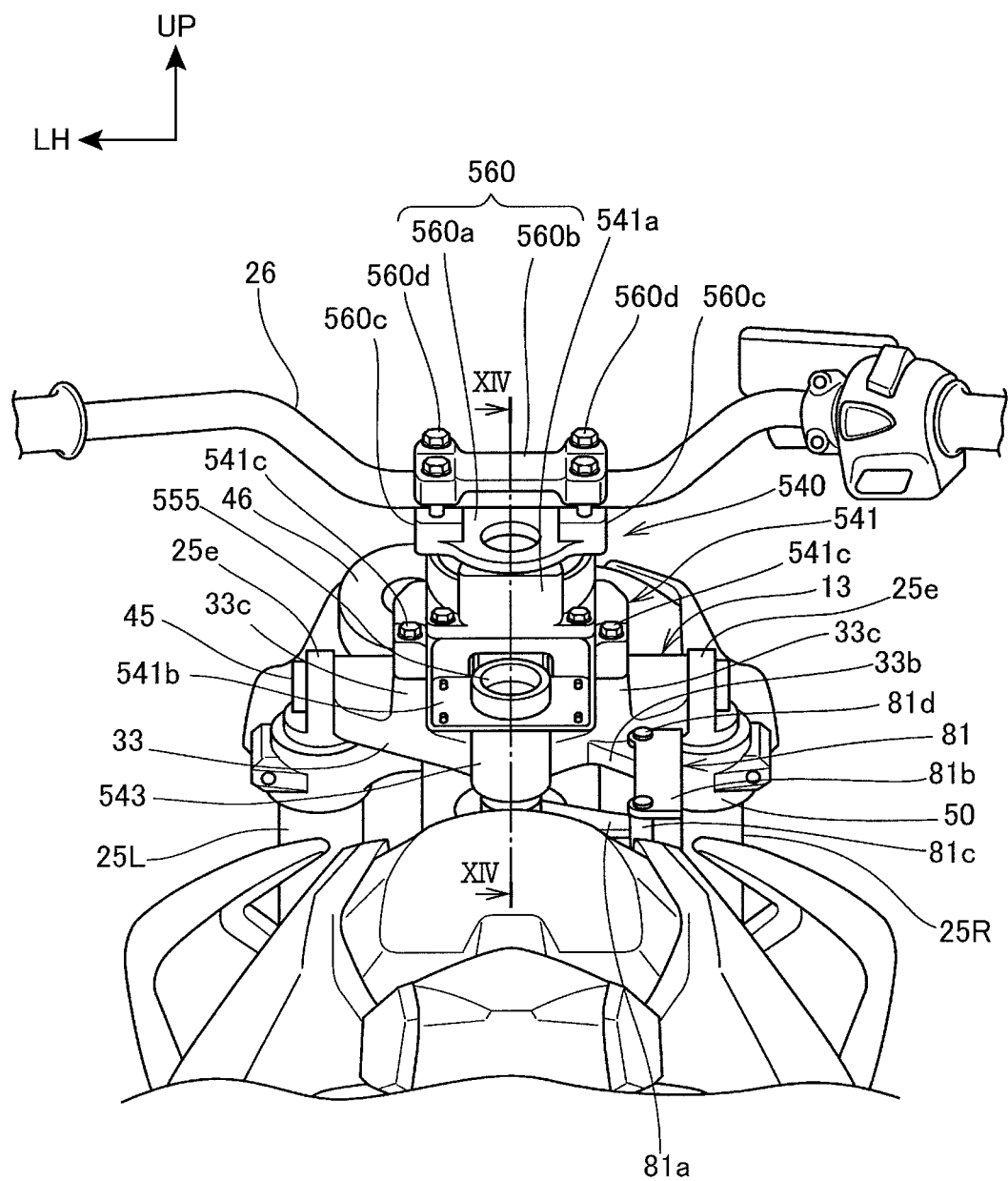
FIG. 13 is a rear elevational view of an upper portion of the steering swivel unit, a steering handle, and peripheral prats as viewed from a rear viewpoint.
Figure 14:
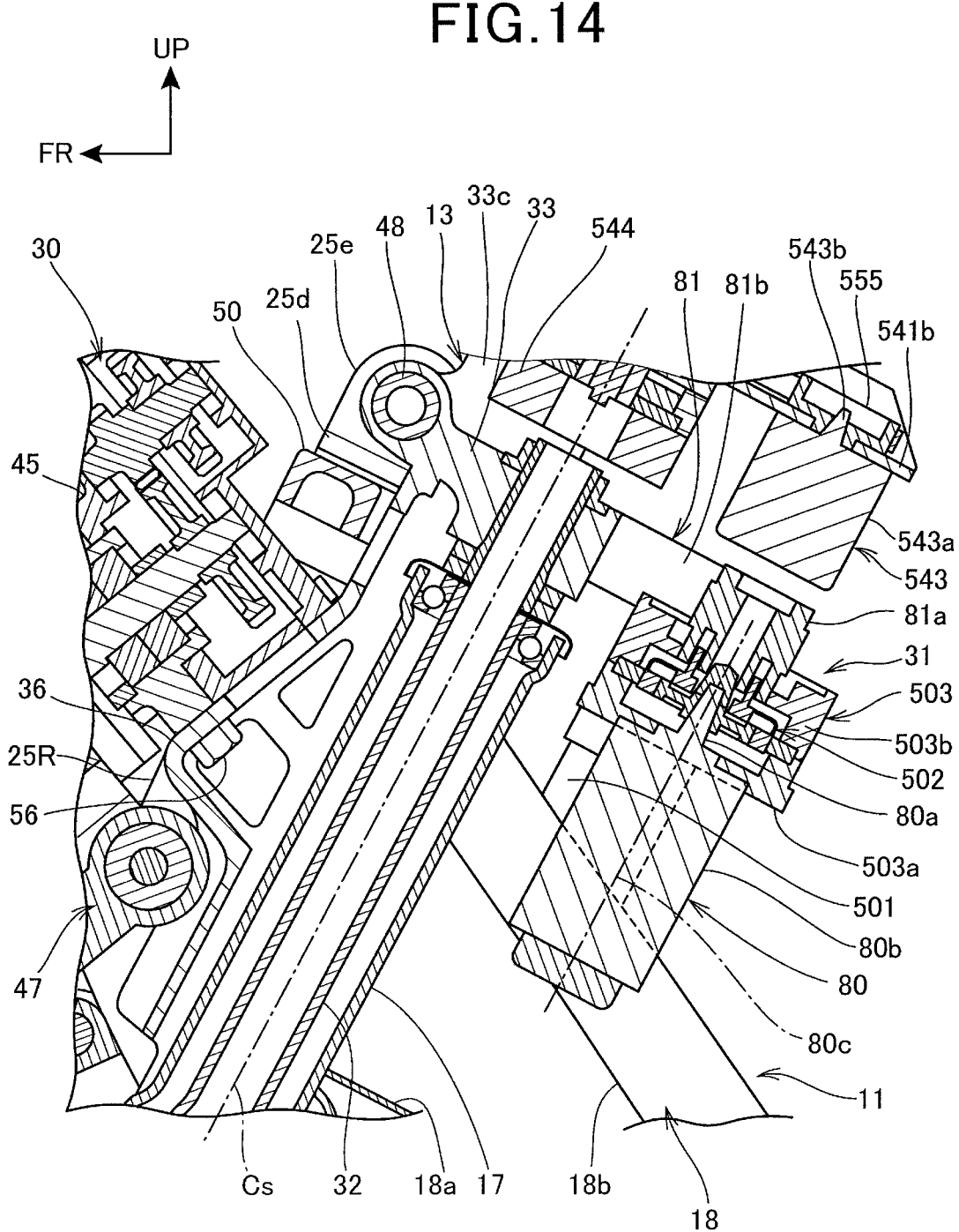
FIG. 14 is a cross-sectional view taken along line XIV-XIV of FIG. 13, depicting the steering swivel unit and peripheral parts in cross-section.

FIG. 12 is a perspective view of the steering swivel unit 13 and peripheral parts as viewed from a rear right viewpoint. FIG. 13 is a rear elevational view of an upper portion of the steering swivel unit 13, the steering handle 26, and peripheral prats as viewed from a rear viewpoint. FIG. 14 is a cross-sectional view taken along line XIV-XIV of FIG. 13, depicting the steering swivel unit 13 and peripheral parts in cross-section.

As depicted in FIGS. 1 and 12, the main frame 18 includes a pair of left and right lower frames 18a extending rearwardly from a lower portion of the head pipe 17 and coupled to the pivot frame 20, and a pair of left and right upper frames 18b extending rearwardly and downwardly from an upper portion of the head pipe 17 and coupled to respective upper surfaces of front portions of the lower frames 18a. The upper frames 18b and the lower frames 18a are in the form of a pipe.

The left and right upper frames 18b are spaced apart from each other by a progressively larger distance transversely across the vehicle 1 in a rearward direction away from the rear surface of the head pipe 17.

A pair of left and right upward extensions 501 are provided respectively on the upper frames 18b and extend upwardly from respective upper surfaces of the upper frames 18b. The upward extensions 501 are in the form of blocks extending vertically substantially parallel to the steering axis Cs as viewed in side elevation. The upward extensions 501 are spaced rearwardly from the rear surface of head pipe 17. The upward extensions 501 are provided along the respective upper frames 18b, so that the distance between the upward extensions 501 transversely across the vehicle 1 is progressively larger in the rearward direction.

As depicted in FIGS. 12 through 14, the automatic steering mechanism 31 includes the steering motor 80, which includes an electric motor, a speed reducer 502 for reducing the speed of rotation of the steering motor 80, a housing 503 (cross member) housing the speed reducer 502 therein, and the steering link 81.

The housing 503 includes a base 503a fixed to the upward extensions 501 on the upper frames 18b and interconnecting the upward extensions 501 in the transverse directions of the vehicle 1, and a tubular casing 503b extending upwardly from a transversely central portion of the base 503a.

The housing 503 is mounted on the upper frames 18b with the base 503a fixed to respective upper surfaces of the upward extensions 501. Specifically, the base 503a is fastened to the upper surfaces of the upward extensions 501 by bolts 503c that are inserted from above into transversely opposite ends of the base 503a and threaded into the upward extensions 501.

The steering motor 80 includes a motor body 80b housing a rotor, etc. therein and a rotational shaft 80a as the output shaft of the steering motor 80. The steering motor 80 is shaped as a column that is elongate along a central axis 80c of the rotational shaft 80a.

The steering motor 80 is mounted on the housing 503 such that the rotational shaft 80a enters the housing 503 from below and the motor body 80b is fixed to the lower end of the base 503a. In other words, the steering motor 80 is supported on the main frame 18 through the housing 503 and the upward extensions 501.

The steering motor 80 is fixed in place such that the axis 80c thereof lies parallel to the steering axis Cs as viewed in side elevation and is oriented vertically. The steering motor 80 is disposed such that the axis 80c thereof lies parallel to the head pipe 17 as viewed in side elevation.

The steering motor 80 is disposed centrally in the transverse directions of the vehicle 1 behind the head pipe 17, and positioned between the left and right upper frames 18b in the transverse directions of the vehicle 1. Specifically, the steering motor 80 is provided as suspended downwardly from the housing 503, and the motor body 80b is positioned in a space between the left and right upward extensions 501. The motor body 80b has a lower portion positioned in a space between the upper frames 18b. The motor body 80b is provided in overlapping relation to the upward extensions 501 and the upper frames 18b as viewed in side elevation, and has its left and right side portions covered with the upward extensions 501 and the upper frames 18b.

The steering motor 80 thus covered with the upward extensions 501 and the upper frames 18b is protected thereby and concealed for a better appearance. As the steering motor 80 is disposed centrally in the transverse directions of the vehicle 1, it allows the vehicle 1 to have a good weight balance in the transverse directions of the vehicle 1.

The speed reducer 502 is disposed in the casing 503b of the housing 503. The rotational shaft 80a of the steering motor 80 is connected to an input component of the speed reducer 502, whose output component is connected to the steering link 81.

The speed reducer 502 includes a wave gearing device disposed coaxially with the axis 80c of the rotational shaft 80a, and provides a high speed reduction ratio. The speed reducer 502 may be a speed reducer called "Harmonic Drive" (registered trademark), for example.

The steering link 81 includes a turn arm 81a connected to the output component of the speed reducer 502, a joint arm 81b interconnecting the turn arm 81a and the top bridge 33, a joint shaft 81c connecting the turn arm 81a and the joint arm 81b angularly movably to each other, and a joint shaft 81d connecting the joint arm 81b and the top bridge 33 angularly movably to each other.

The turn arm 81a extends from an upper surface of the housing 503 transversely to one side (the right), and is angularly movable by the steering motor 80 through the speed reducer 502.

The joint arm 81b has a rear end coupled to an outer end of the turn arm 81a by the joint shaft 81c. The joint arm 81b extends in the longitudinal directions of the vehicle 1 at a position that is offset from the head pipe 17 transversely to one side.

The joint arm 81b has a front end coupled to the top bridge 33 by the joint shaft 81d. Specifically, the top bridge 33 has a connector 33b at a position offset from the head pipe 17 transversely to one side (the right), and the joint arm 81b is coupled to the connector 33b by the joint shaft 81d.

The steering link 81 is a link movable about axes that are provided by the shaft about which the turn arm 81a is angularly movable, the joint shaft 81c, the joint shaft 81d, and the steering axis Cs.

Since the steering motor 80 extends upwardly from the upper frames 18b in the vicinity of the rear surface of the head pipe 17, the steering motor 80 is close to the top bridge 33 that is positioned above the head pipe 17. Therefore, the steering motor 80 can easily be connected to the top bridge 33 by the steering link 81.

Figure 15:
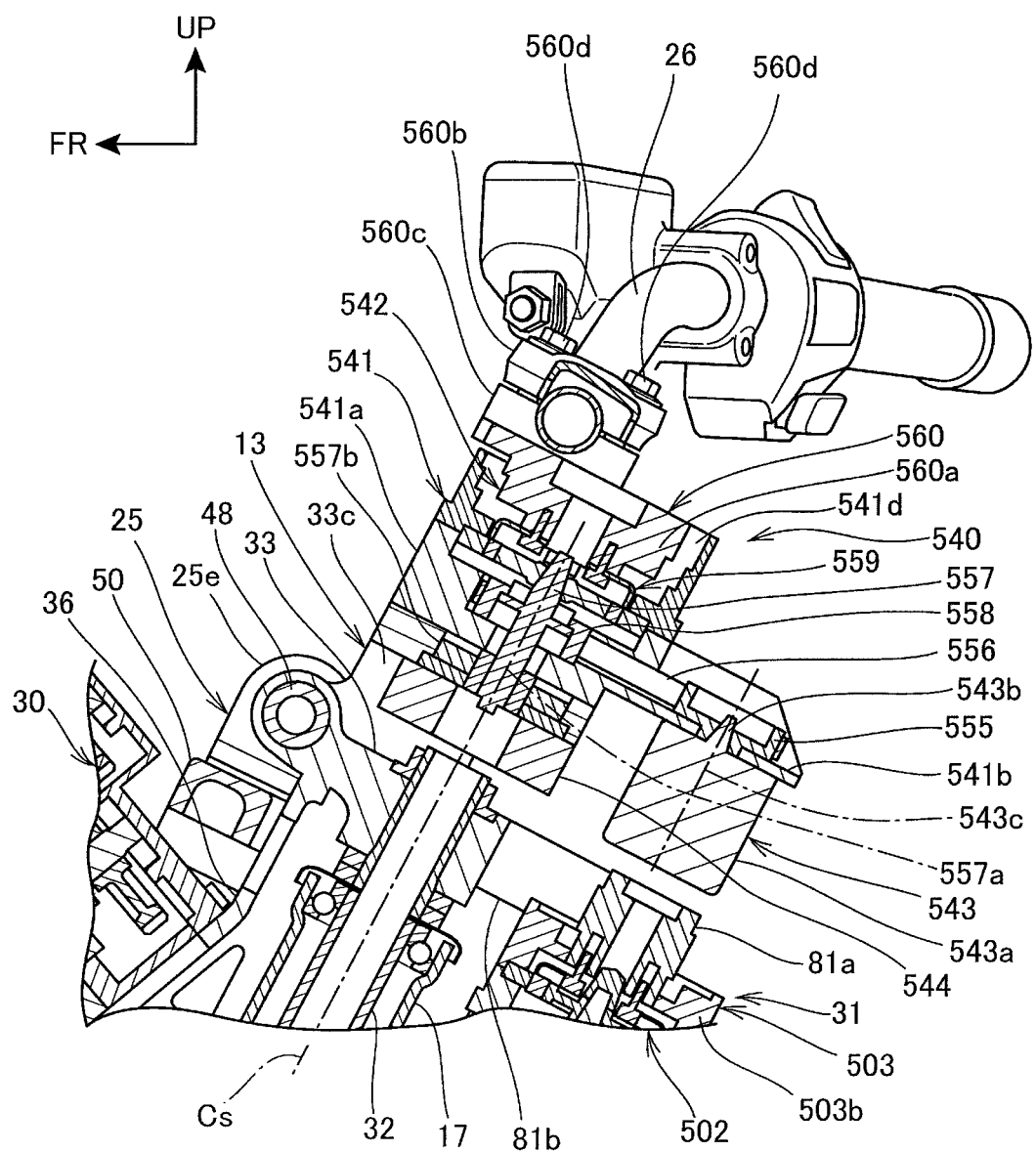
FIG. 15 is a cross-sectional view taken along line XIV-XIV of FIG. 13, depicting the steering handle and peripheral parts in cross-section.

FIG. 15 is a cross-sectional view taken along line XIV-XIV of FIG. 13, depicting the steering handle 26 and peripheral parts in cross-section.

The vehicle 1 includes a steering handle turning mechanism 540 that turns the steering handle 26 about the steering axis Cs with respect to the steering swivel unit 13.

As depicted in FIGS. 12 through 15, the steering handle turning mechanism 540 is provided on the upper surface of the top bridge 33.

The steering handle turning mechanism 540 includes a case 541 mounted on the upper surface of the top bridge 33, a rotor 542 housed in the case 541, a handle turning motor 543 (handle drive source) for actuating the rotor 542, and a handle turning lock mechanism 544 for locking (limiting) the rotor 542 against rotation.

The steering handle turning mechanism 540 also includes a drive pulley 555 provided coaxially with the handle turning motor 543 and a belt-like power transmitting member 556 operatively interconnecting the drive pulley 555 and the rotor 542.

The top bridge 33 has a pair of left and right supports 33c projecting upwardly from an upper surface thereof. The left and right supports 33c are disposed in respective left and right positions one on each side of the steering shaft 32.

The case 541 includes a box-shaped case body 541a and a plate-like rearward extension 541b extending rearwardly from a rear surface of the case body 541a. The rearward extension 541b is inclined rearwardly and downwardly perpendicularly to the steering axis Cs.

The case 541 is disposed such that the case body 541a has a bottom surface placed on upper surfaces of the left and right supports 33c and interconnecting the supports 33c in the transverse directions of the vehicle 1.

The case 51 is fastened to the supports 33c by case fastening bolts 541c that are threaded from above into the case body 541a.

The rotor 542 is housed in the case body 541a.

The rotor 542 includes a turn shaft 557 angularly movably supported in the case body 541a, a driven pulley 558 fixed to the turn shaft 557, a speed reducer 559 connected to the upper end of the turn shaft 557, and a handle holder 560 connected to the speed reducer 559.

The turn shaft 557 has a central axis 557a about which the rotor 542 is rotatable. The turn shaft 557 is positioned above the steering shaft 32 and coaxially with the steering axis Cs, with the central axis 557a being oriented vertically.

The driven pulley 558 is operatively connected to the drive pulley 555 through the power transmitting member 556.

The turn shaft 557 has an upper end connected to an input component of the speed reducer 559. The speed reducer 559 has an output component connected to the handle holder 560.

The speed reducer 559 includes a wave gearing device disposed coaxially with the axis 557a of the turn shaft 557, and provides a high speed reduction ratio. The speed reducer 559 may be a speed reducer called "Harmonic Drive" (registered trademark), for example.

The handle holder 560 is exposed upwardly through an opening 541d (FIG. 15) defined in an upper portion of the case body 541a. The handle holder 560 includes a base 560a connected to the output component of the speed reducer 559 and a cap 560b fixed to an upper portion of the base 560a.

The steering handle 26 is fixed to the handle holder 560 by having a transverse central portion thereof sandwiched between the cap 560b and the base 560a.

The handle turning lock mechanism 544 is mounted on a lower surface of the case body 541a. The handle turning lock mechanism 544 is positioned between the left and right supports 33c and above the steering shaft 32. The handle turning lock mechanism 544 is thus provided compactly in a space between the steering shaft 32 and the case body 541a.

The handle turning lock mechanism 544, the turn shaft 557, the driven pulley 558, the speed reducer 559, and the handle holder 560 are disposed coaxially with the axis 557a of the turn shaft 557, about which the steering handle 26 is angularly movable. Consequently, the rotor 542 and the handle turning lock mechanism 544 are provided in a compact layout.

The handle turning lock mechanism 544 includes an electromagnetic clutch.

The rotor 542 includes a lock member 557b (FIG. 15) disposed on the lower end of the turn shaft 557 for angular movement in unison therewith.

When an electromagnet of the handle turning lock mechanism 544 is not energized, its plunger is biased by a biasing member into engagement with the lock member 557b of the turn shaft 557, preventing the turn shaft 557 from rotating about its own axis.

When the electromagnet of the handle turning lock mechanism 544 is energized, the plunger is actuated by magnetic forces of the electromagnet out of engagement with the lock member 557b against the bias of the biasing member.

Therefore, when the electromagnet of the handle turning lock mechanism 544 is not energized, the turn shaft 557 is non-rotatable, and hence the output shaft of the handle turning motor 543 connected to the turn shaft 557 by the power transmitting member 556, etc. is also non-rotatable. When the electromagnet of the handle turning lock mechanism 544 is energized, the turn shaft 557 is rotatable, and hence the output shaft of the handle turning motor 543 is also rotatable.

The handle turning motor 543 includes a motor body 543a housing a rotor, etc. and a rotational shaft 543b as the output shaft thereof.

The handle turning motor 543 is disposed such that the rotational shaft 543b extends from below through the rearward extension 541b of the case 541 and the motor body 543a is fixed to a lower surface of the rear extension 541b. In other words, the handle turning motor 543 is secured in place such that it is suspended downwardly from the rearward extension 541b.

The rotational shaft 543b of the handle turning motor 543 has a central axis 543c extending parallel to the central axis 557a of the turn shaft 557.

The drive pulley 555 is fixed to the rotational shaft 543b. The power transmitting member 556 extends forwardly from the drive pulley 555 over an upper surface of the rearward extension 541b and is operatively connected to the driven pulley 558.

The handle turning motor 543 is disposed rearwardly of the rotor 542 and beneath the rearward extension 541b. The handle turning motor 543 is disposed centrally of the steering handle 26 in the transverse directions of the vehicle 1 and above the steering motor 80. The central axis 543c of the handle turning motor 543 is positioned substantially coaxially with the central axis 80c of the steering motor 80.

Rotation of the handle turning motor 543 is transmitted therefrom successively through the drive pulley 555, the power transmitting member 556, the driven pulley 558, the turn shaft 557, and the speed reducer 559 to the handle holder 560.

When the handle holder 560 is turned, the steering handle 26 is turned about the central axis 557a of the turn shaft 557, i.e., about the steering axis Cs. The steering handle 26 is angularly movable independently of the steering swivel unit 13.

According to the first embodiment, the central axis 557a and the steering axis Cs are coaxial with each other. However, even if the central axis 557a is displaced out of alignment with the steering axis Cs, the steering handle 26 can be regarded as being angularly movable about the steering axis Cs.

The handle turning lock mechanism 544 is disposed upstream of the speed reducer 559 with respect to the path along which the rotation is transmitted from the handle turning motor 543 to the steering handle 26.

Figure 16:
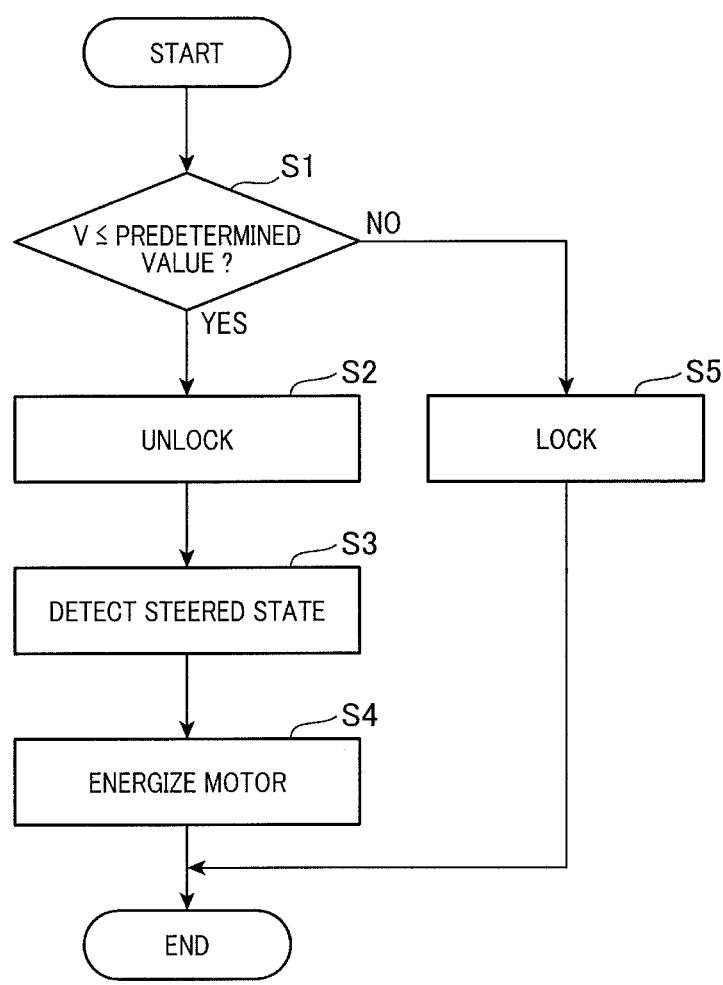
FIG. 16 is a flowchart of a steering handle turn control process.

The controller 83 performs a steering handle turn control process depicted in FIG. 16 for preventing the steering handle 26 from being turned when the front wheel 2 is automatically steered by the automatic steering mechanism 31. The controller 83 performs the steering handle turn control process depicted in FIG. 16 repeatedly at predetermined time intervals.

FIG. 16 is a flowchart of the steering handle turn control process.

As depicted in FIG. 16, the controller 83 initially determines whether or not the vehicle speed V detected by the vehicle speed sensor 87 is equal to or lower than a predetermined speed (e.g., 4 kilometers per hour) (step S1).

If the vehicle speed V is equal to or lower than the predetermined speed including an at-rest state (0 kilometer per hour) (step S1: YES), then the controller 83 actuates the handle turning lock mechanism 544 to unlock the turn shaft 557 locked by the handle turning lock mechanism 544 (step S2). The rotational shaft 543b of the handle turning motor 543 is now rotatable.

Then, the controller 83 detects a steered state of the front wheel 2 with the steering angle sensor 85 (step S3). Specifically, in step S3, the steering angle (steering direction) of the front wheel 2 and the angular velocity of steering movement of the front wheel 2 are detected. The steering angle of the front wheel 2 is 0 when the front wheel 2 is directed straight forwardly. The state where the steering handle 26 is not turned to either the left or the right, as depicted in FIG. 13, is referred to as a reference position for the steering angle of the steering handle 26.

Thereafter, the controller 83 energizes the handle tuning motor 543 to turn the steering handle 26 in an opposite direction to the steering direction detected in step S3 (step S4). The steering handle 26 is now turned in an opposite direction to the steering swivel unit 13 that turns in unison with the front wheel 2.

For example, if the front wheel 2 is steered through 5° to the right by the automatic steering mechanism 31, then the controller 83 energizes the handle tuning motor 543 to turn the handle 26 through 5° to the left at the same angular velocity as the angular velocity of the steering movement of the front wheel 2. In this case, though the steering handle 26 is turned relatively to the steering swivel unit 13, the steering handle 26 is not turned with respect to the vehicle frame 11, but stays in the reference position referred to above, and remains essentially still on the steering swivel unit 13. As the steering handle 26 is turned about the central axis 557a that is coaxial with the steering axis C2, the steering handle 26 does not move to the left or right.

Accordingly, even when the front wheel 2 is steered by the automatic steering mechanism 31, since the steering handle 26 does not turn with respect to the vehicle frame 11, the steering movement of the front wheel 2 caused by the automatic steering mechanism 31 is prevented from affecting the rider who is gripping the steering handle 26.

Figure 17:
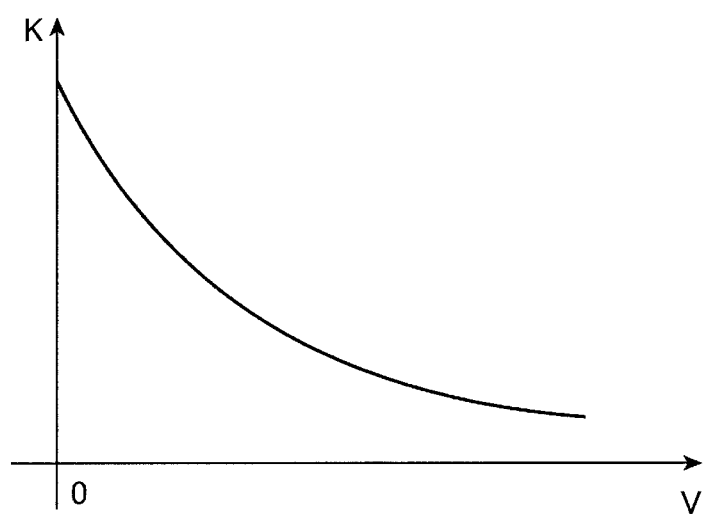
FIG. 17 is a diagram depicting the relationship between the gain of a process of controlling a handle turning motor and the vehicle speed.

FIG. 17 is a diagram depicting the relationship between the gain K of a process of controlling the handle turning motor 543 and the vehicle speed V.

In step S4, the controller 83 determines a current command value (a target value for an energizing current) for the handle turning motor 543 by multiplying the difference between the detected value of the steering angle of the front wheel 2 and a target value for the turned position (steering angle) of the steering handle 26 by a gain K having a predetermined value. Here, the target value for the turned position of the steering handle 26 is 0°.

As depicted in FIG. 17, the gain K is the largest when the vehicle speed V is 0, and becomes progressively smaller as the vehicle speed V goes higher.

Therefore, when the vehicle speed V is smaller, the angle through which the steering handle 26 is turned in the opposite direction to the direction in which the front wheel 2 is steered is larger, and when the vehicle speed V goes higher, the angle through which the steering handle 26 is turned in the opposite direction to the direction in which the front wheel 2 is steered becomes smaller.

For example, when the vehicle speed V is 0 kilometer per hour and the front wheel 2 is steered 10° to the right by the automatic steering mechanism 31, since the gain K is large, the steering handle 26 is steered 10° to the left. In this case, the steering handle 26 remains essentially still, and the steering angle thereof from the reference position is 0°.

When the vehicle speed V is 2 kilometers per hour and the front wheel 2 is steered 10° to the right by the automatic steering mechanism 31, since the gain K is smaller than when the vehicle speed V is 0 kilometer per hour, the steering handle 26 is steered 5° to the left, for example. In this case, the steering handle 26 is turned 5° to the right from the reference position.

According to the first embodiment, as described above, even if the front wheel 2 is steered through the same angle, the angle through which the steering handle 26 is turned in the opposite direction is smaller as the vehicle speed V is higher. Therefore, when the vehicle speed V is low, the steering movement of the front wheel 2 caused by the automatic steering mechanism 31 is prevented from affecting the rider who is gripping the steering handle 26. When the vehicle speed V goes higher, making it easier for the vehicle 1 to be stable, the turning movement of the steering handle 26 allows the rider to recognize the direction in which the front wheel 2 is steered by the automatic steering mechanism 31. Furthermore, since the angle through which the steering handle 26 in the direction in which the front wheel 2 is steered is turned becomes progressively greater as the vehicle speed V increases, the rider finds it easy to drive the vehicle 1.

Referring back to FIG. 16, if the vehicle speed V exceeds the predetermined speed (step S1: NO), then the controller 83 stops energizing the handle turning lock mechanism 544, which locks the turn shaft 557 against turning movement (step S5).

According to the first embodiment, when the vehicle speed V is high and the front wheel 2 is not steered by the automatic steering mechanism 31, the steering handle 26 is directly connected to the top bridge 33 by the handle turning lock mechanism 544. Therefore, the rider is able to steer the front wheel 2 directly through the steering handle 26.

In addition, inasmuch as the handle turning lock mechanism 544 locks the turn shaft 557 when not energized by the controller 83, the rider is able to steer the front wheel 2 directly through the steering handle 26 even though no electric power is supplied.

Figure 18:
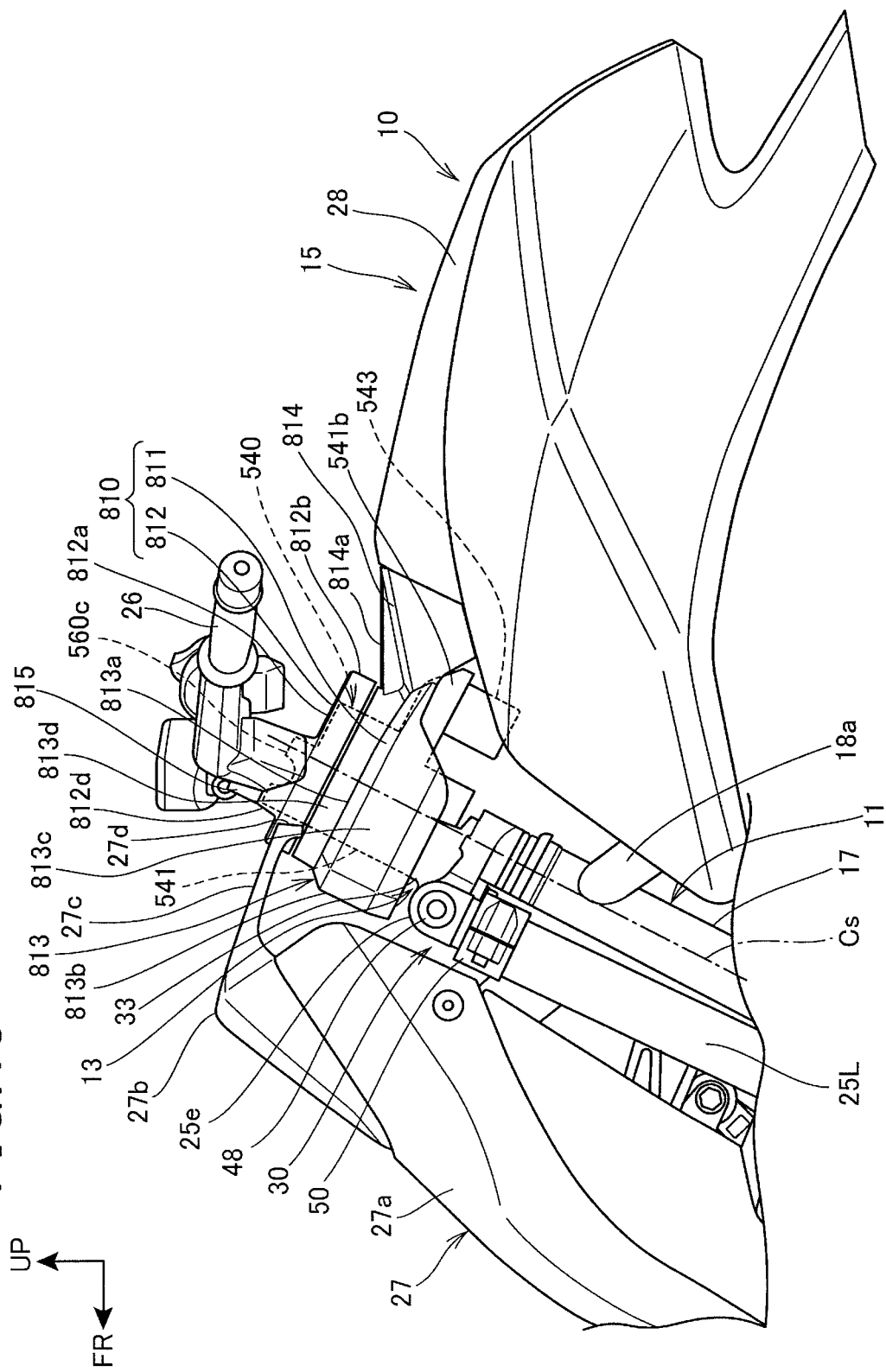
FIG. 18 is a left-hand side elevational view of the steering swivel unit and peripheral parts.
Figure 19:
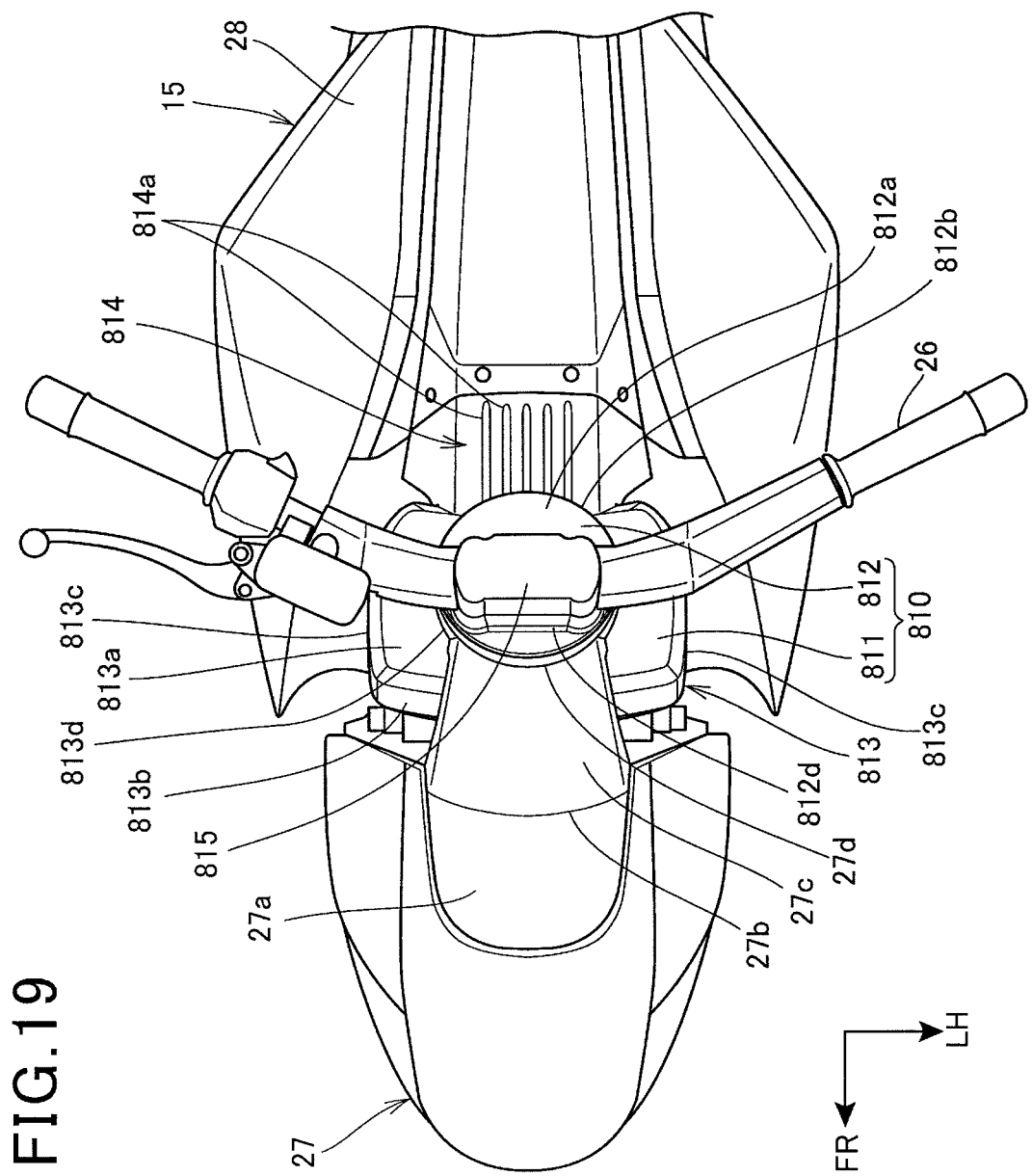
FIG. 19 is a plan view of the front portion of the vehicle.

FIG. 18 is a left-hand side elevational view of the steering swivel unit 13 and peripheral parts. FIG. 19 is a plan view of the front portion of the vehicle 1.

The vehicle cover 15 includes a cover assembly 810 covering the steering swivel unit 13 from above. The cover assembly 810 is positioned centrally in the transverse directions of the vehicle 1 and disposed between the front cover 27 and the tank cover 28 in the longitudinal directions of the vehicle 1.

The cover assembly 810 is disposed below the steering handle 26 and covers the steering handle turning mechanism 540 from above which is provided on the upper surface of the top bridge 33.

Figure 20:
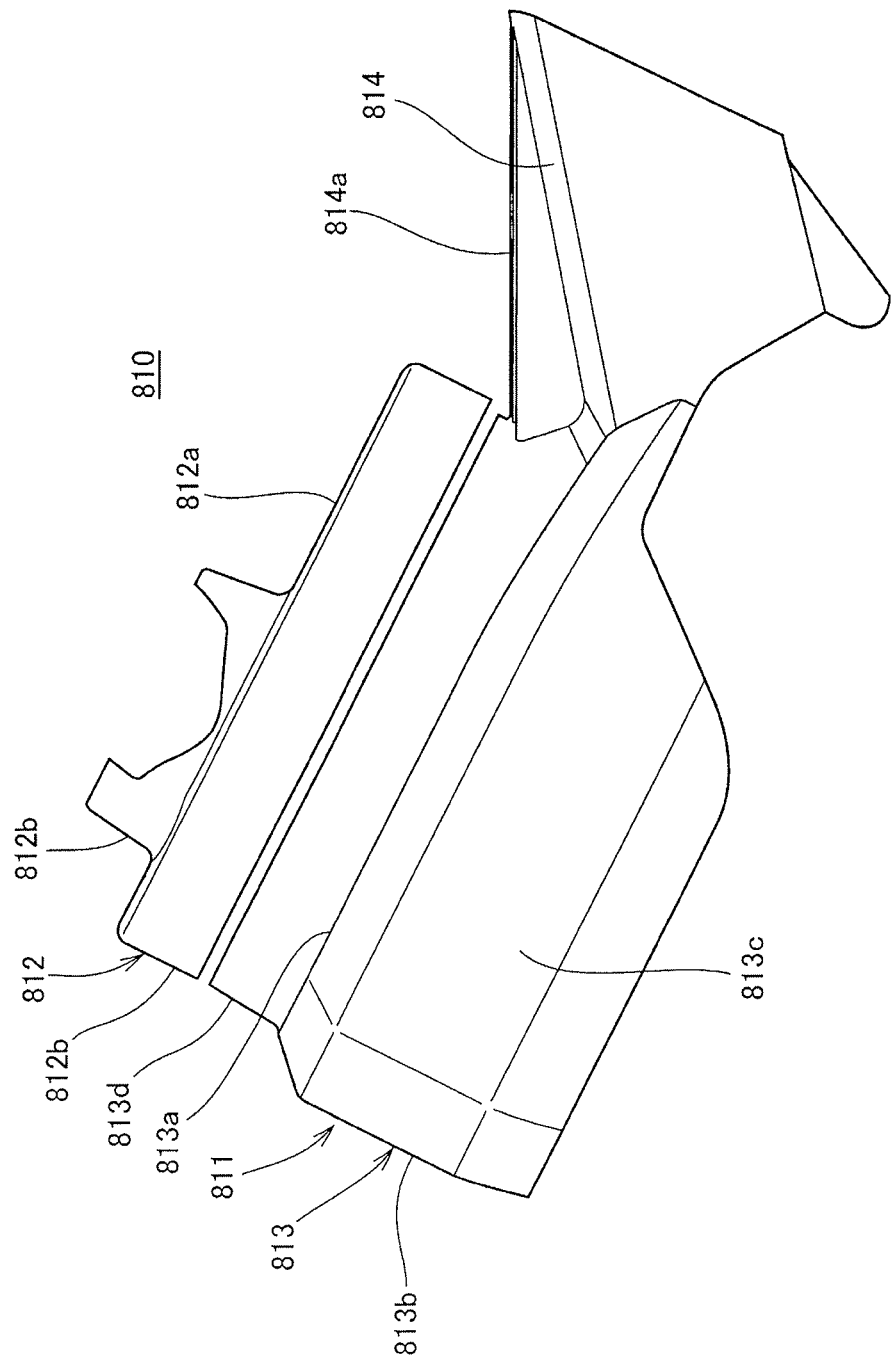
FIG. 20 is a left-hand side elevational view of a cover assembly.
Figure 21:
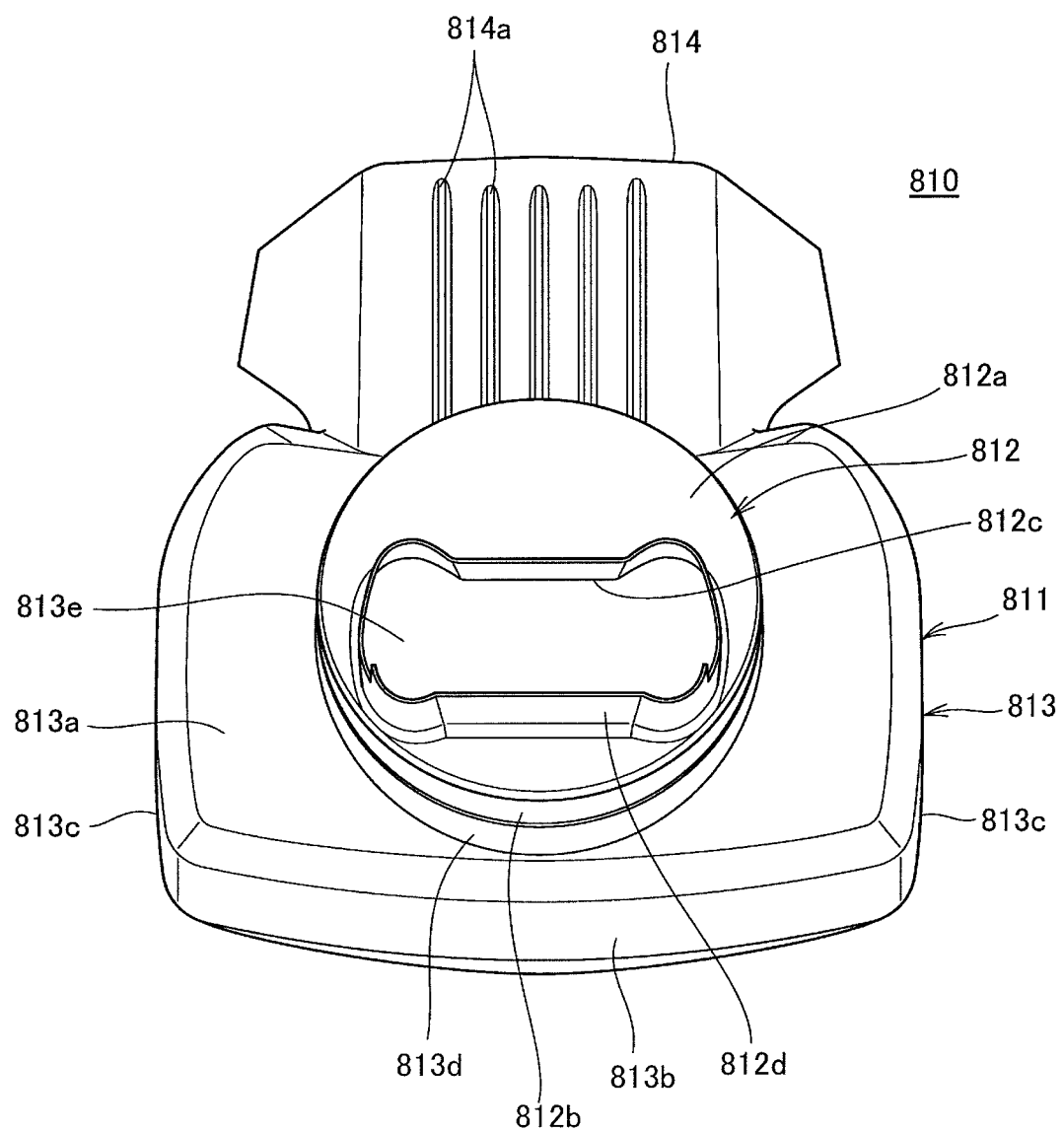
FIG. 21 is a plan view of the cover assembly.
Figure 22:
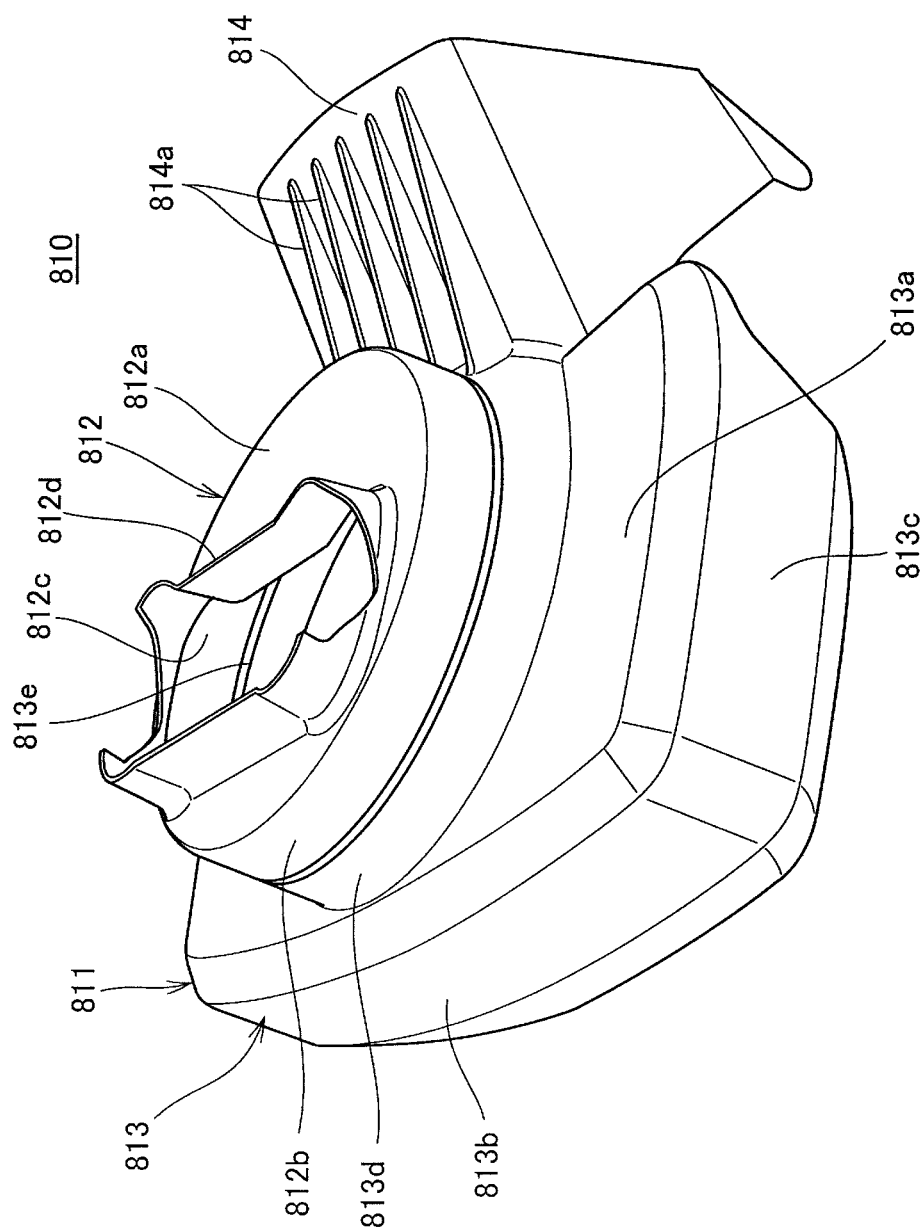
FIG. 22 is a perspective view of the cover assembly.

FIG. 20 is a left-hand side elevational view of the cover assembly 810. FIG. 21 is a plan view of the cover assembly 810. FIG. 22 is a perspective view of the cover assembly 810.

As depicted in FIGS. 18 through 22, the cover assembly 810 includes a fixed cover 811 fixed to the vehicle body 10 and a movable cover 812 covering an upper surface of the fixed cover 811 from above.

The fixed cover 811 includes a box-shaped portion 813 and a rearward extension 814 extending rearwardly from the box-shaped portion 813.

The box-shaped portion 813 has an upper face 813a extending rearwardly and downwardly as viewed in side elevation, a front face 813b extending downwardly from a front edge of the upper face 813, and a pair of side faces 813c extending downwardly from respective side edges of the upper face 813a. The box-shaped portion 813 is open downwardly.

The box-shaped portion 813 has a hollow cylindrical tubular member 813d disposed centrally on the upper face 813a in the transverse directions of the vehicle 1 and extending upwardly. The tubular member 813d has an inner peripheral surface that defines a circular upper opening 813e that extends vertically through the upper face 813a.

The rearward extension 814 extends rearwardly from a rear edge of the upper face 813a to a front edge 28a of the tank cover 28, and is contiguous to the front edge 28a. The fixed cover 811 is fixed to the vehicle body 10 with the rearward extension 814 being attached to the tank cover 28. The fixed cover 811 may alternatively be fixed to another cover than the vehicle cover 15, the vehicle frame 11, or the like.

The rearward extension 814 has a plurality of longitudinally extending upper ribs 814a formed on an upper surface thereof.

The movable cover 812 includes an upper wall 812a (upper face) which is circular in shape as viewed along the steering axis Cs and a hollow cylindrical peripheral wall 812b extending downwardly from the peripheral edge of the upper wall 812a toward the fixed cover 811.

The movable cover 812 has an opening 812c defined centrally in the upper wall 812a in the transverse directions of the vehicle 1 and extending vertically through the upper wall 812a. The movable cover 812 has an upwardly extending rib 812d formed along the peripheral edge of the opening 812c.

The hollow cylindrical peripheral wall 812b of the movable cover 812 is disposed coaxially with the hollow cylindrical tubular member 813d of the fixed cover 811, and has an outside diameter that is substantially the same as the outside diameter of the hollow cylindrical tubular member 813d. The hollow cylindrical peripheral wall 812b is thus vertically contiguous to the hollow cylindrical tubular member 813d.

The movable cover 812 is disposed in a manner to cover the circular upper opening 813e in the fixed cover 811 from above, and the hollow cylindrical peripheral wall 812b has a lower edge disposed closely to an upper edge of the hollow cylindrical tubular member 813d of the fixed cover 811.

As depicted in FIGS. 15 and 18, the fixed cover 811 is disposed around the case 541 of the steering handle turning mechanism 540 in covering relation thereto, the case 541 being housed within the box-shaped portion 813. An upper portion of the case 541 and the handle holder 560 are exposed upwardly through the upper opening 813e of the fixed cover 811.

The upper portion of the case 541 and the handle holder 560 are covered from above by the movable cover 812 which is disposed over the upper opening 813e of the fixed cover 811.

The handle holder 560 has an upper portion exposed upwardly through the opening 812c of the movable cover 812.

As depicted in FIGS. 13 and 15, the base 560a of the handle holder 560 has a pair of handle supports 560c provided on an upper surface thereof which extend upwardly from respective left and right positions that are spaced from the steering axis Cs. The cap 560b is fastened to upper surfaces of the handle supports 560c by a plurality of cap fastening bolts 560d.

As depicted in FIGS. 18 through 22, the handle supports 560c of the handle holder 560 are fitted from below in the opening 812c of the movable cover 812. The steering handle 26 is fixed to the handle supports 560c that extend through the opening 812c upwardly of the movable cover 812.

The movable cover 812 is fixed to the base 560a of the handle holder 560. Therefore, when the steering handle 26 is turned, the movable cover 812 is turned in unison with the steering handle 26 and the steering swivel unit 13. In other words, the movable cover 812 is turned relatively to the fixed cover 811. The axis about which the movable cover 812 is turned is aligned with the steering axis Cs.

Since the movable cover 812 that is fitted over the handle supports 560c is turned in unison with the handle holder 560, the opening 812c does not need to be large enough to let the handle supports 560c turn in the movable cover 812. Consequently, the movable cover 812 covers a wide area of the handle holder 560.

The movable cover 812 is positioned on the base 560a by the handle supports 560c fitted in the opening 812c.

The opening 812c is shaped complementarily to the outer profile of the handle supports 560c, i.e., front surfaces, rear surfaces, and left and right outer side surfaces of the handle supports 560c. Therefore, the handle supports 560c are snugly fitted in the opening 812c.

As depicted in FIGS. 18 and 19, the cap 560b is covered from above by the handle cover 815 that covers the rib 812d from above.

As depicted in FIGS. 18 through 20, the front cover 27 includes an extension cover 27c extending rearwardly from an upper edge 27b of a front cover face 27a that extends rearwardly and upwardly.

The extension cover 27c extends rearwardly and downwardly from the upper edge 27b, and is contiguous to a front edge of the hollow cylindrical peripheral wall 812b of the movable cover 812. The trail-length changing mechanism 30 that is disposed between the head pipe 17 and the front cover 27 is thus covered from above and hence concealed by the extension cover 27c. The extension cover 27c has a rear edge 27d that is arcuate along the hollow cylindrical peripheral wall 812b. Therefore, the extension cover 27c covers a wide area around the trail-length changing mechanism 30.

According to the first embodiment of the present invention, as described above, the vehicle 1 includes the vehicle frame 11, the steering swivel unit 13 supported on the head pipe 17 of the vehicle frame 11 and angularly movable about the steering axis Cs, the front wheel 2 angularly movable in unison with the steering swivel unit 13, and the automatic steering mechanism 31 for angularly moving the steering swivel unit 13. The vehicle frame 11 includes the main frame 18 extending rearwardly from the head pipe 17. The automatic steering mechanism 31 includes the steering motor 80 for angularly moving the steering swivel unit 13. The steering motor 80 is supported on the main frame 18. Therefore, the steering motor 80 of the automatic steering mechanism 31 can be well supported with a simple structure, utilizing the main frame 18.

As steering motor 80 is disposed centrally in the transverse directions of the vehicle 1, behind the head pipe 17, it allows the vehicle 1 to have a good weight balance in the transverse directions of the vehicle 1.

The main frame 18 includes the pair of left and right upper frames 18b extending rearwardly from the head pipe 17, and the steering motor 80 is disposed in a position between the left and right upper frames 18b. Accordingly, the steering motor 80 is effectively supported, using the left and right upper frames 18b. Since the steering motor 80 is positioned in a space between the left and right upper frames 18b, the steering motor 80 is covered with the upper frames 18b and is protected thereby and concealed for a better appearance.

The pair of left and right upward extensions 501 extend upwardly from the upper frames 18b, and the steering motor 80 is supported on the upper frames 18b through the upward extensions 501 and disposed between the left and right upward extensions 501. Therefore, the steering motor 80 is covered with the upward extensions 501 and protected thereby and concealed for a better appearance. The steering motor 80 is disposed in a high position, making it easy to transmit power thereof to the top bridge 33 in the upper portion of the steering swivel unit 13.

The housing 503 that serves as a cross member interconnecting the left and right upward extensions 501 in the transverse directions of the vehicle 1 are provided, and the steering motor 80 is mounted on the lower surface of the housing 503. The housing 503 increases the rigidity of the main frame 18, and covers the steering motor 80 to protect the steering motor 80 and provide an improved appearance.

Since the speed reducer 502 for reducing the speed of output power from the steering motor 80 is supported on the housing 503, the speed reducer 502 is supported with a simple structure.

The steering motor 80 is an electric motor and is disposed such that the rotational shaft 80a thereof has its central axis 80c directed vertically. Therefore, the steering motor 80 is disposed compactly in the transverse directions of the vehicle 1.

Furthermore, as the steering motor 80 is coupled to the steering swivel unit 13 through the steering link 81 that is positioned outwardly of the head pipe 17 in the transverse directions of the vehicle 1, the steering motor 80 is capable of exerting large drive power to the steering swivel unit 13, making it possible to turn the steering swivel unit 13 with ease.

According to the first embodiment of the present invention, in addition, the vehicle 1 includes the vehicle frame 11, the steering swivel unit 13 supported on the head pipe 17 of the vehicle frame 11 and angularly movable about the steering axis Cs, the front wheel 2 angularly movable in unison with the steering swivel unit 13, the steering handle 26 mounted on the steering swivel unit 13, and the steering handle turning mechanism 540 that makes the steering handle 26 angularly movable about the steering axis Cs relatively to the steering swivel unit 13. The steering handle turning mechanism 540 includes the handle turning motor 543 for angularly moving the steering handle 26 about the steering axis Cs. When the steering handle 26 is turned relatively to the steering swivel unit 13 by the handle turning motor 543, the steering handle 26 can be turned in a direction different from the direction in which the front wheel 2 is steered. Therefore, the movement of the steering handle 26 that is linked with the movement of the front wheel 2 is made less liable to be transmitted to the rider.

The steering swivel unit 13 includes the steering shaft 32 rotatably supported by the head pipe 17, the top bridge 33 fixed to the upper end of the steering shaft 32, and the bottom member 34 fixed to the lower end of the steering shaft 32, the steering handle turning mechanism 540 being mounted on the top bridge 33. Since the steering handle turning mechanism 540 is mounted on the top bridge 33 of the steering swivel unit 13, it is easy to realize a structure that allows the rider to turn the top bridge 33 directly through the steering handle 26 in the event of a malfunction of the handle turning motor 543.

The steering handle turning mechanism 540 includes the handle turning lock mechanism 544 for locking the steering handle 26 against angular movement relative to the steering swivel unit 13. When the steering handle 26 is locked by the handle turning lock mechanism 544, therefore, the rider is able to turn the steering swivel unit 13 directly through the steering handle 26.

Furthermore, inasmuch as the steering handle turning mechanism 540 includes the speed reducer 559 for reducing the speed of rotation of the handle turning motor 543 and transmitting the reduced-speed rotation to the steering handle 26, the steering handle 26 can easily be turned by the handle turning motor 543. In addition, power that is transmitted from the steering handle 26 to the handle turning motor 543 tends to be accelerated. Therefore, when the rider is to turn the steering swivel unit 13 through the steering handle 26, the rider finds it easy to turn the steering swivel unit 13 through the steering handle 26 because the steering handle 26 is hard to turn relatively to the steering swivel unit 13.

The handle turning lock mechanism 544 is disposed upstream of the speed reducer 559 with respect to the path along which the rotation is transmitted from the handle turning motor 543 to the steering handle 26. Since rotation that is transmitted from the steering handle 26 through the speed reducer 559 to the handle turning motor 543 tends to be accelerated, the torque transmitted from the steering handle 26 through the speed reducer 559 to the handle turning motor 543 is reduced. Therefore, the handle turning lock mechanism 544 that is disposed upstream of the speed reducer 559 is able to limit rotation of the handle turning motor 543 even if the handle turning lock mechanism 544 is of a reduced locking capability, allowing the rider to turn the steering swivel unit 13 easily through the steering handle 26.

The steering handle turning mechanism 540 includes the case 541 disposed above the steering swivel unit 13 and the rotor 542 housed in the case 541 and actuatable by the handle turning motor 543, the steering handle 26 being supported on the upper end of the rotor 542. The rotor 542 that is actuatable by the handle turning motor 543 can thus be supported with a simple structure by the case 541 disposed above the steering swivel unit 13, and the steering handle 26 is provided at an upper position where it is easy for the rider to manipulate the steering handle 26.

The rotor 542 includes the turn shaft 557 angularly movable by the handle turning motor 543, the handle holder 560 supporting the steering handle 26, and the speed reducer 559 for reducing the speed of rotation transmitted to the turn shaft 557 and transmitting the reduced-speed rotation to the handle holder 560. The turn shaft 557, the speed reducer 559, and the handle holder 560 are provided coaxially with each other. Therefore, the steering handle turning mechanism 540 is provided in a compact layout.

The handle turning motor 543 is disposed rearwardly of the rotor 542 and mounted on the case 541. Therefore, the handle turning motor 543 is provided compactly in a position where it can easily actuate the rotor 542.

The handle turning lock mechanism 544 is mounted on the lower surface of the case 541 and engages the lower end of the rotor 542. The handle turning lock mechanism 544 is thus fixed in position with a simple structure and provided in a compact layout.

Since the handle turning lock mechanism 544 is provided coaxially with the central axis 557a of the turn shaft 557 about which the steering handle 26 can be turned, the handle turning lock mechanism 544 is provided in a compact layout.

Furthermore, the central axis 557a of the turn shaft 557 about which the steering handle 26 can be turned is coaxial with the steering axis Cs. Consequently, even when the steering swivel unit 13 is steered to the left or right, the steering handle 26 can be angularly moved about the steering axis Cs. Therefore, the movement of the steering handle 26 can effectively be reduced and is less liable to be transmitted to the rider.

Moreover, the controller 83 energizes the handle turning motor 543 to turn the steering handle 26 in the opposite direction to the direction in which the steering swivel unit 13 is turned. Accordingly, the angle through which the steering handle 26 is turned at the time the front wheel 2 is turned is reduced.

The controller 83 also changes the angle through which the steering handle 26 is turned in the opposite direction, depending on the vehicle speed V detected by the vehicle speed sensor 87. Therefore, the angle through which the steering handle 26 is turned can be of an appropriate value depending on the vehicle speed V.

Furthermore, the controller 83 reduces the angle through which the steering handle 26 is turned in the opposite direction as much as the vehicle speed V increases. Therefore, when the vehicle speed V is low, the angle through which the steering handle 26 is turned by the steering of the front wheel 2 is small. As the vehicle speed V goes higher, the movement of the steering handle 26 becomes synchronized with the direction in which the front wheel 2 is steered. Thus, the rider finds it easy to drive the vehicle 2.

Moreover, as the vehicle 1 includes the automatic steering mechanism 31 for automatically turning the steering swivel unit 13, the angle through which the steering handle 26 is turned is reduced at the time the front wheel 2 is automatically steered by the automatic steering mechanism 31.

If it is detected that the vehicle speed V detected by the vehicle speed sensor 87 is in excess of the predetermined speed, then the handle turning lock mechanism 544 locks the steering handle 26 against angular movement relative to the steering swivel unit 13. When the vehicle speed V exceeds the predetermined speed, therefore, the steering handle 26 is directly connected to the steering swivel unit 13 by the handle turning lock mechanism 544, so that the rider can steer the front wheel 2 directly through the steering handle 26.

According to the first embodiment of the present invention, furthermore, the vehicle 1 includes the vehicle frame 11, the steering swivel unit 13 supported on the head pipe 17 of the vehicle frame 11 and angularly movable about the steering axis Cs, the steering handle 26 mounted on the steering swivel unit 13, and the cover assembly 810 covering the steering swivel unit 13 from above. The cover assembly 810 includes the fixed cover 811 that is fixed to the vehicle body 10 and the movable cover 812 that covers the upper opening 813e of the fixed cover 811 and that is angularly movable with respect to the fixed cover 811, the movable cover 812 being angularly movable in unison with the steering handle 26. The fixed cover 811 fixed to the vehicle body 10 and the movable cover 812 cover the steering swivel unit 13 from above. Since the movable cover 812 is angularly movable in unison with the steering handle 26, it covers a wide area around the steering swivel unit 13.

The upper wall 812a of the movable cover 812 has the opening 812c in which there is fitted the handle holder 560 that supports the steering handle 26 on the steering swivel unit 13. Accordingly, the movable cover 812 is positioned by the handle holder 560 and covers a wide area around the handle holder 560.

Since the opening 812c is shaped complementarily to the outer profile of the handle holder 560, the movable cover 812 is positioned to a nicety by the handle holder 560 and covers a wide area around the handle holder 560.

As the movable cover 812 has the upwardly extending rib 812d formed along the peripheral edge of the opening 812c, the rib 812d increases the rigidity of the movable cover 812 and covers the handle holder 560 sideways. In case the rib 812d abuts against the handle holder 560, the movable cover 812 and the handle holder 560 are held in abutment against each other over an increased area, making it possible to position the movable cover 812 effectively on the handle holder 560.

The movable cover 812 includes the upper wall 812a which is circular in shape as viewed along the steering axis Cs and the hollow cylindrical peripheral wall 812b extending from the peripheral edge of upper wall 812a toward the fixed cover 811. Therefore, even when the movable cover 812 is angularly moved, the movable cover 812 is not likely to present an obstacle to surrounding parts. Accordingly, the movable cover 812 may be of an increased size to cover a wide range.

The front cover 27 that covers the head pipe 17 on its front side includes the extension cover 27c extending rearwardly from the upper edge 27b thereof. The rear edge of the extension cover 27c is contiguous to the front edge of the movable cover 812. Therefore, the extension cover 27c covers the space between the upper edge 27b of the front cover 27 and the front edge of the movable cover 812.

The vehicle 1 further includes the steering handle turning mechanism 540 that turns the steering handle 26 about the steering axis Cs with respect to the steering swivel unit 13, and the cover assembly 810 covers the steering handle turning mechanism 540 from above. Therefore, the cover assembly 810 effectively conceals the steering handle turning mechanism 540.

According to the first embodiment of the present invention, moreover, the vehicle 1 includes the vehicle body 10, the front wheel 2 disposed forwardly of the vehicle body 10 and steerable about the steering axis Cs, the vehicle body 10 including the vehicle frame 11 and the steering swivel unit 13 supported on the vehicle frame 11 and angularly movable about the steering axis Cs, and the trail-length changing mechanism 30 for changing the trail length t of the front wheel 2. The trail-length changing mechanism 30 includes the swing assembly 41 that supports the front fork legs 25L and 25R which are swingable in the longitudinal directions and support the front wheel 2, and the electric motor 42 as a drive source for swinging the swing assembly 41, the electric motor 42 being supported on the vehicle body 10. Since the electric motor 42 is supported on the vehicle body 10, the electric motor 42 is close to the steering axis Cs and hence lowers the steering inertia.

Since the electric motor 42 is supported on the steering swivel unit 13 on the vehicle body 10, the electric motor 42 is close to the steering axis Cs and hence lowers the steering inertia. Furthermore, as the steering swivel unit 13 is angularly movable in unison with the swing assembly 41, power from the electric motor 42 supported on the steering swivel unit 13 is transmitted through a simple structure to the swing assembly 41, swinging the swing assembly 41.

Moreover, the electric motor 42 is disposed forwardly of the steering swivel unit 13 as viewed in side elevation, and the central axis 42c of the rotational shaft 42b thereof is oriented vertically. Therefore, the electric motor 42 is disposed compactly for lowering the steering inertia. The central axis 42c may be oriented in the vertical directions of the vehicle 1, or may be oriented substantially in the vertical directions of the vehicle 1 or may be oriented in the vertical directions of the vehicle 1 in an inclined posture as viewed in side elevation in FIG. 10, for example.

The trail-length changing mechanism 30 includes the ball screw mechanism 43 for converting rotation of the electric motor 42 into linear motion to cause the swing assembly 41 to swing. The ball screw mechanism 43 is disposed such that the central axis of the screw shaft 51 thereof lies parallel to the central axis 42c of the electric motor 42. Therefore, the electric motor 42 and the ball screw mechanism 43 are disposed in a compact layout, thereby lowering the steering inertia.

The trail-length changing mechanism 30 further includes the speed reducer 45 for transmitting rotation of the electric motor 42 at a reduced ratio to the ball screw mechanism 43, and the lock mechanism 46 for limiting the electric motor 42 against rotation is disposed upstream of the speed reducer 45 with respect to the path along which the rotation of the electric motor 42 is transmitted. Since rotation transmitted from the swing assembly 41 through the ball screw mechanism 43 and the speed reducer 45 to the electric motor 42 tends to be accelerated, the torque that is transmitted from the swing assembly 41 through the speed reducer 45 to the electric motor 42 is reduced. Therefore, the lock mechanism 46 that is disposed upstream of the speed reducer 45 is able to limit rotation of the electric motor 42 even if the lock mechanism 46 is of a reduced locking capability, making it easy to limit operation of the trail-length changing mechanism 30.

As the lock mechanism 46 is disposed coaxially with the central axis 42c of the electric motor 42, the lock mechanism 46 is provided in a compact fashion.

The trail-length changing mechanism 30 further includes the link mechanism 47 that couples the ball screw mechanism 43 to the swing assembly 41 and the steering swivel unit 13, and the steering swivel unit 13 includes the steering shaft 32 rotatably supported by the head pipe 17 of the vehicle frame 11, the top bridge 33 fixed to the upper end of the steering shaft 32, and the bottom member 34 fixed to the lower end of the steering shaft 32. The swing assembly 41 is swingably supported by the swing shaft 48 provided on the top bridge 33 and is coupled to the bottom member 34 through the link mechanism 47. The swing assembly 41 that is swingable about the swing shaft 48 on the top bridge 33 can thus swing through the link mechanism 47 coupled to the bottom member 34, so that the swing assembly 41 can swing with a compact structure for changing the trail length t.

The swing assembly 41 includes the bottom bridge 49 interconnecting the left and right front fork legs 25L and 25R, and the link mechanism 47 is coupled to the bottom bridge 49. The link mechanism 47 is thus coupled to the swing assembly 41 with a compact structure, using the bottom bridge 49 that increases the rigidity of the front fork legs 25L and 25R.

The bracket 36 that interconnects the top bridge 33 and the bottom member 34 of the steering swivel unit 13 is provided forwardly of the head pipe 17, and the electric motor 42 is supported on the vehicle body 10 by the bracket 36. As the bracket 36 interconnects the top bridge 33 and the bottom member 34 forwardly of the head pipe 17, the bracket 36 is close to the steering axis Cs. Consequently, the electric motor 42 is disposed closely to the steering axis Cs, thereby lowering the steering inertia.

According to the first embodiment, furthermore, the vehicle 1 includes the vehicle body 10, the front wheel 2 disposed forwardly of the vehicle body 10 and steerable about the steering axis Cs, the front fork legs 25L and 25R that support the front wheel 2, the vehicle body 10 including the vehicle frame 11 and the steering swivel unit 13 supported on the head pipe 17 of the vehicle frame 11 and angularly movable about the steering axis Cs, and the trail-length changing mechanism 30 for changing the trail length t of the front wheel 2. The trail-length changing mechanism 30 includes the swing shaft 48 extending in the transverse directions of the vehicle 1 and coupling the front fork legs 25L and 25R swingably to the steering swivel unit 13, the swing shaft 48 being disposed in a position aligned with the fork leg axis 25a of the front fork legs 25L and 25R as viewed in side elevation. Since the front fork legs 25L and 25R swing about the swing shaft 48 disposed in the position aligned with the fork leg axis 25a, the inertial mass of the front fork legs 25L and 25R at the time they swing to change the trail length t is reduced. Therefore, the trail-length changing mechanism 30 can easily change the trail length t.

Inasmuch as the swing shaft 48 is provided on the upper ends of the front fork legs 25L and 25R, the swing shaft 48 is provided compactly by effectively utilizing a space at the upper ends of the front fork legs 25L and 25R. As no space needs to be kept above the swing shaft 48 for swinging movement of the front fork legs 25L and 25R, the degree of freedom for the layout of parts is high.

The front fork legs 25L and 25R have the fork caps 25d that close the upper openings of the front fork legs 25L and 25R, and the swing shaft 48 is provided on the fork caps 25d. Therefore, the swing shaft 48 is provided in a simple structure using the fork caps 25d.

The steering swivel unit 13 includes the steering shaft 32 rotatably supported by the head pipe 17 of the vehicle frame 11, the top bridge 33 fixed to the upper end of the steering shaft 32, and the bottom member 34 fixed to the lower end of the steering shaft 32, and the trail-length changing mechanism 30 includes the electric motor 42 and the link mechanism 47 interconnecting the front fork legs 25L and 25R and the bottom member 34, for causing the front fork legs 25L and 25R to swing with power from the electric motor 42, the swing shaft 48 being supported on the top bridge 33. The front fork legs 25L and 25R supported by the swing shaft 48 on the top bridge 33 can thus swing through the link mechanism 47 coupled to the bottom member 34, so that the front fork legs 25L and 25R can swing with a compact structure for thereby changing the trail length t.

Moreover, the front fork legs 25L and 25R include an electronically controlled suspension capable of automatically changing their axial length, and the vehicle 1 includes the controller 83 for actuating the electronically controlled suspension to reduce a change in the height of the vehicle 1 caused when the trail-length changing mechanism 30 operates, depending on that change in the height of the vehicle 1. Consequently, even when the trail-length changing mechanism 30 changes the trail length t, a change in the height of the vehicle 1 is reduced. When the vehicle 1 is at rest, the height of the vehicle 1 may be reduced by the electronically controlled suspension to allow the rider to secure its footing on the vehicle 1 with ease.

Second Embodiment

A second embodiment of the present invention will be described below with reference to FIGS. 23 and 24. Those parts of the second embodiment which are identical to those of the first embodiment are denoted by identical reference characters, and will not be described below.

The second embodiment is different from the first embodiment in that it has a structure for changing a torque transmitted between the steering motor 80 and the steering swivel unit 13.

Figure 23:
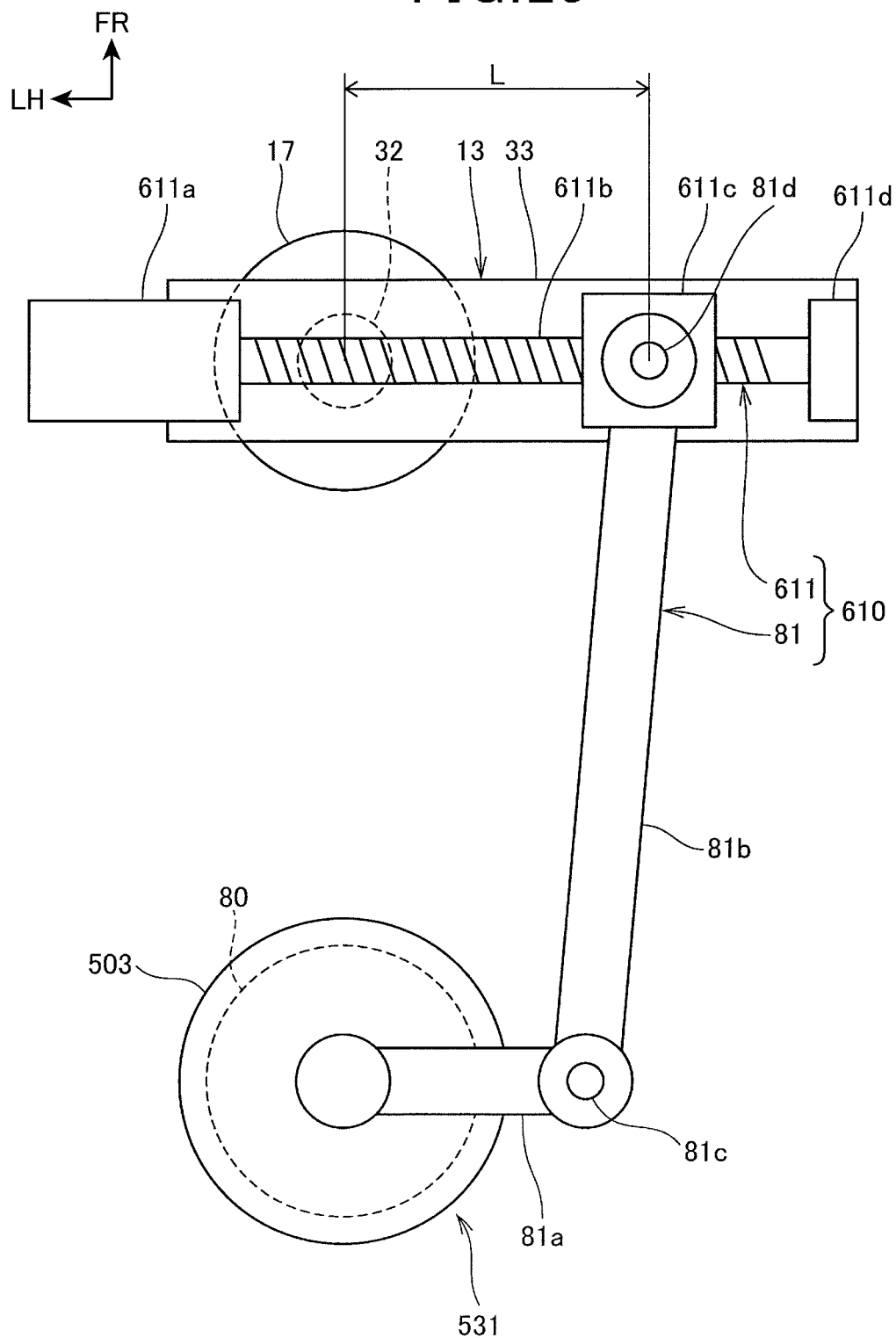
FIG. 23 is a schematic plan view of an automatic steering mechanism according to a second embodiment of the present invention.

FIG. 23 is a schematic plan view of an automatic steering mechanism 531 according to a second embodiment of the present invention.

As depicted in FIG. 23, the automatic steering mechanism 531 includes the steering motor 80, a speed reducer 502 (FIG. 14), a housing 503, and a transmitted torque changing mechanism 610.

The transmitted torque changing mechanism 610 includes the steering link 81 and a screw mechanism 611 provided on the upper surface of the top bridge 33.

The screw mechanism 611 includes a transmitted torque changing motor 611a provided on the upper surface of the top bridge 33, a screw shaft 611b having an end coupled to the transmitted torque changing motor 611a, a nut 611c threaded over the screw shaft 611b, and a bearing 611d mounted on the top bridge 33 and supporting the other end of the screw shaft 611b.

The transmitted torque changing motor 611a is disposed remotely from the steering link 81 with the head pipe 17 interposed therebetween in the transverse directions of the vehicle. The transmitted torque changing motor 611a is connected to the controller 83 (FIG. 11).

The screw shaft 611b extends over the top bridge 33 from the transmitted torque changing motor 611a toward the steering link 81 in a transverse direction of the vehicle. The other end of the screw shaft 611b is supported by the bearing 611d that is disposed on an outer end of the top bridge 33 in the transverse direction of the vehicle.

The joint arm 81b of the steering link 81 has a front end coupled to the nut 611c by the joint shaft 81d.

When the controller 83 energizes the transmitted torque changing motor 611a to rotate the screw shaft 611b about its own axis, the nut 611c moves on the screw shaft 611b in a transverse direction of the vehicle. The distance L from the steering shaft 32 (steering axis Cs) to the nut 611c changes, changing the torque that is transmitted from the steering motor 80 to steering swivel unit 13.

Specifically, the portion of the screw shaft 611b that corresponds to the distance L functions as a torque transmitting arm for transmitting the torque from the steering motor 80 to the steering swivel unit 13. When the distance L that represents the length of the torque transmitting arm is changed, the torque transmitted from the steering motor 80 to the steering swivel unit 13 is changed.

Figure 24:
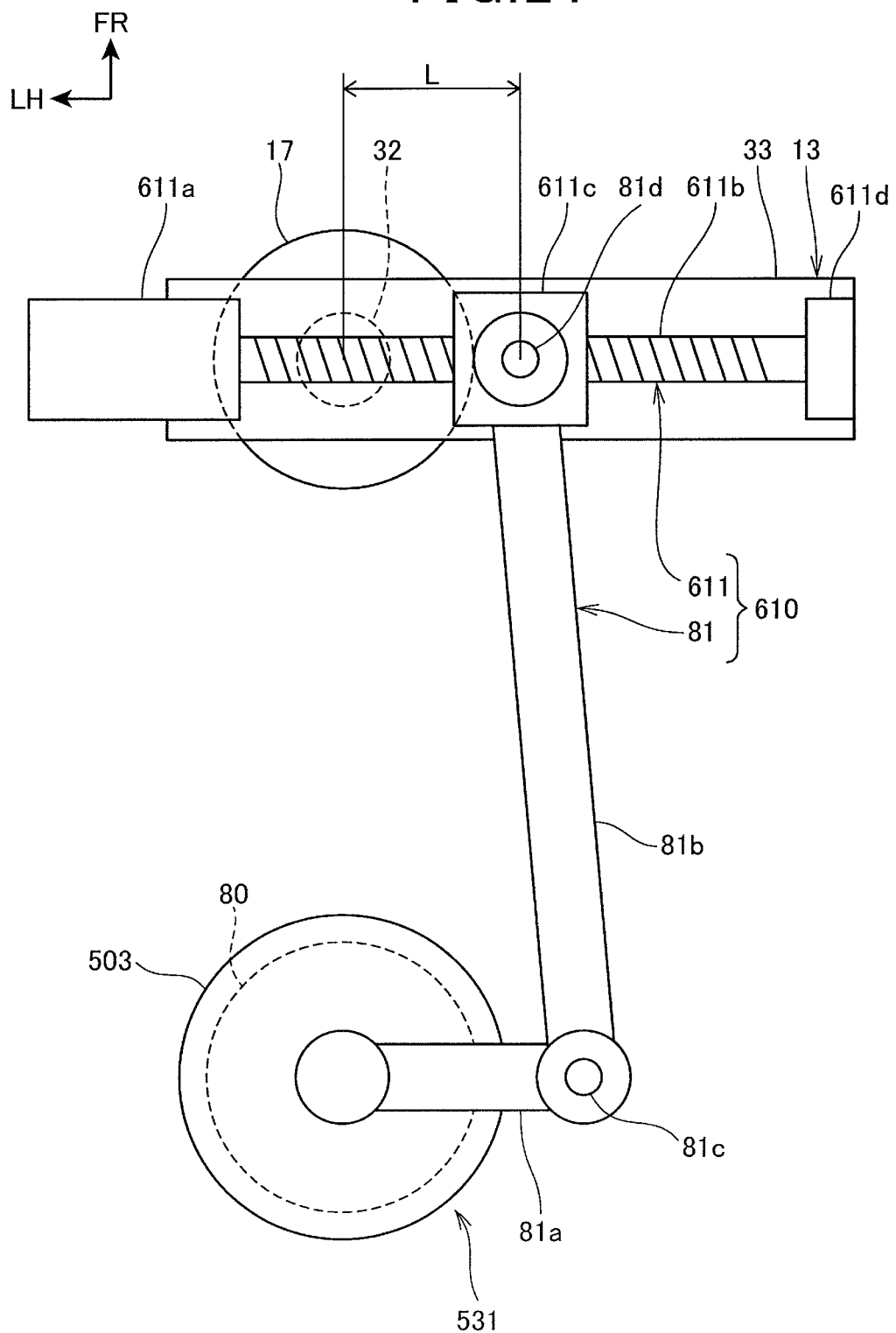
FIG. 24 is a schematic plan view of the automatic steering mechanism, with a speed reduction ratio changed from the state depicted in FIG. 23.

FIG. 24 is a schematic plan view depicting the length of the torque transmitting arm which has been changed from the state depicted in FIG. 23.

In FIG. 24, the nut 611c has moved toward the steering shaft 32 from the state depicted in FIG. 23, and the distance L that represents the length of the torque transmitting arm is smaller than that depicted in FIG. 23. In other words, the length of the torque transmitting arm depicted in FIG. 24 is smaller than that depicted in FIG. 23, and the length of the torque transmitting arm depicted in FIG. 23 is larger than that depicted in FIG. 24.

When the length of the torque transmitting arm is larger as depicted in FIG. 23, the torque transmitted from the steering motor 80 through the steering link 81 to the top bridge 33 is larger, so that it is easier for the steering motor 80 to turn the steering swivel unit 13.

If the rider attempts to turn the steering motor 80 from the steering swivel unit 13 side when the length of the torque transmitting arm is larger, then since the transmitted torque is reduced, the rider finds it hard to turn the steering motor 80. Therefore, providing the length of the torque transmitting arm is larger, if the rider attempts to manually turn the steering swivel unit 13 through the steering handle 26 while the steering motor 80 is de-energized, the steering motor 80 presents resistance (friction), making the rider feel heavy in steering the steering swivel unit 13.

When the length of the torque transmitting arm is smaller as depicted in FIG. 24, the torque transmitted from the steering motor 80 through the steering link 81 to the top bridge 33 is smaller, so that it is harder for the steering motor 80 to turn the steering swivel unit 13.

If the rider attempts to turn the steering motor 80 from the steering swivel unit 13 side when the length of the torque transmitting arm is smaller, then since the transmitted torque is increased, the rider finds it easy to turn the steering motor 80. Therefore, providing the length of the torque transmitting arm is smaller, if the rider attempts to manually turn the steering swivel unit 13 through the steering handle 26 while the steering motor 80 is de-energized, the resistance presented by the steering motor 80 is reduced, making the rider feel light in steering the steering swivel unit 13.

If the vehicle speed detected by the vehicle speed sensor 87 is equal to or lower than the predetermined speed (e.g., 4 kilometers per hour) including the at-rest state (0 kilometer per hour) and the front wheel 2 is steered by the automatic steering mechanism 531, then the controller 83 energizes the transmitted torque changing motor 611a, making the length of the torque transmitting arm larger. The steering motor 80 is now able to turn the steering swivel unit 13 easily to steer the front wheel 2.

If the vehicle speed detected by the vehicle speed sensor 87 is in excess of the predetermined speed (e.g., 4 kilometers per hour) and the front wheel 2 is not steered by the automatic steering mechanism 531, then the controller 83 energizes the transmitted torque changing motor 611a, making the length of the torque transmitting arm smaller. When the rider turns the steering handle 26, therefore, the steering motor 80 is less liable to present resistance, and the rider finds it easy to manually steer the front wheel 2.

Third Embodiment

A third embodiment of the present invention will be described below. Those parts of the third embodiment which are identical to those of the first embodiment are denoted by identical reference characters, and will not be described below.

According to the third embodiment, the vehicle includes a separating mechanism for separating the steering motor 80 from the power transmitting path between the steering motor 80 and the steering swivel unit 13 in order to make the rider feel light in steering the steering swivel unit 13.

The separating mechanism (not depicted) includes, for example, an electromagnetic clutch interposed between the steering motor 80 and the steering link 81 in the path along which power is transmitted from the steering motor 80.

If the vehicle speed detected by the vehicle speed sensor 87 is equal to or lower than the predetermined speed (e.g., 4 kilometers per hour) including the at-rest state (0 kilometer per hour) and the front wheel 2 is steered by the automatic steering mechanism 31, then the controller 83 energizes the electromagnetic clutch referred to above, connecting the steering motor 80 to the steering link 81. The steering motor 80 is now able to turn the steering swivel unit 13.

If the vehicle speed detected by the vehicle speed sensor 87 is in excess of the predetermined speed (e.g., 4 kilometers per hour) and the front wheel 2 is not steered by the automatic steering mechanism 31, then the controller 83 de-energizes the electromagnetic clutch, separating the steering motor 80 from the above power transmitting path. When the rider turns the steering handle 26, therefore, the steering motor 80 does not present resistance, and the rider finds it easy to manually steer the front wheel 2.

Moreover, if the controller 83 detects a failure such as a malfunction or the like of the steering motor 80, then the controller 83 de-energizes the electromagnetic clutch, separating the steering motor 80 from the above power transmitting path. In the event of a failure of the steering motor 80, consequently, the steering motor 80 does not present resistance to the steering operation, and the rider finds it easy to manually steer the front wheel 2.

Fourth Embodiment

A fourth embodiment of the present invention will be described below. Those parts of the fourth embodiment which are identical to those of the first embodiment are denoted by identical reference characters, and will not be described below.

The fourth embodiment is different from the first embodiment in that the steering motor 80 assists with steering power in order to make the rider feel light in manually steering the steering swivel unit 13.

According to the fourth embodiment, the power transmitting path from the steering motor 80 (FIG. 14) to the steering shaft 32 includes a torque sensor (not depicted) for detecting a torque acting on the torque transmitting path. The torque sensor is connected to the controller 83.

The torque sensor detects, as a torque, the load imposed on the rider at the time the rider manually turns the steering swivel unit 13 with the steering handle 26.

On the basis of the detected value from the torque sensor, the controller 83 energizes the steering motor 80 in order to reduce the detected value, e.g., to 0. Drive power from the steering motor 80 thus assists in manually steering the steering swivel unit 13, making it easy for the rider to manually steer the front wheel 2.

Fifth Embodiment

A fifth embodiment of the present invention will be described below. Those parts of the fifth embodiment which are identical to those of the first embodiment are denoted by identical reference characters, and will not be described below.

The fifth embodiment is different from the first embodiment in that the vehicle includes a return-to-origin mechanism 710 (FIG. 25) for biasing the steering handle 26 with a biasing member 713 in order to bring the turned position of the steering handle 26 with respect to the vehicle frame 11 into the reference position referred to above.

Figure 25:
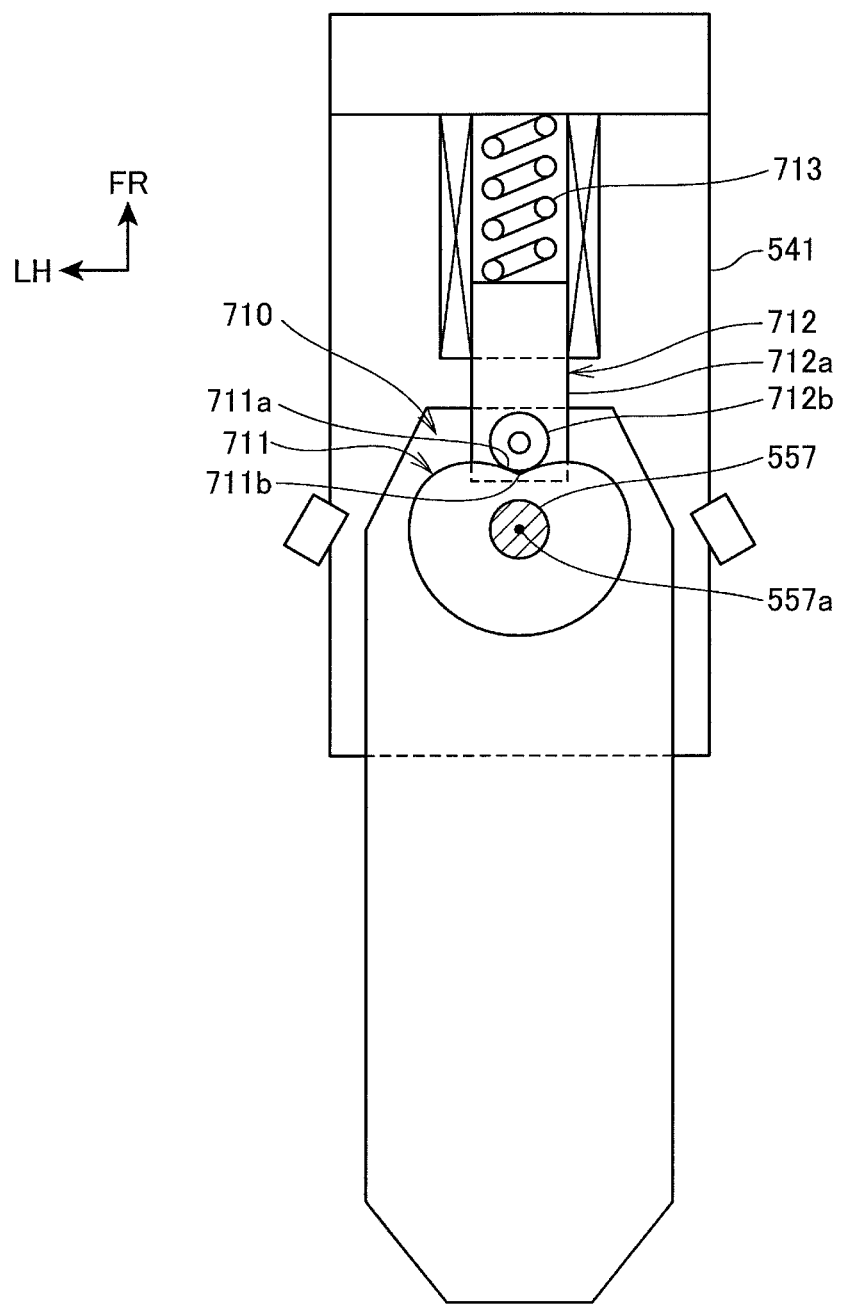
FIG. 25 is a schematic view depicting the structure of a return-to-origin mechanism.

FIG. 25 is a schematic view depicting the structure of the return-to-origin mechanism 710.

The return-to-origin mechanism 710 is provided on the case 541 depicted in FIG. 15, though the return-to-origin mechanism 710 is not illustrated in FIG. 15.

The return-to-origin mechanism 710 includes a cam 711 fixed to a turn shaft 557 of the steering handle turning mechanism 540, a presser 712 pressed against the cam 711, and the biasing member 713 for biasing the presser 712 to abut against the cam 711.

The cam 711 includes a substantially circular cam fitted over and fixed to the outer circumferential surface of the turn shaft 557, and is angularly movable in unison with the turn shaft 557. In other words, the cam 711 is angularly movable in unison with the steering handle 26.

The cam 711 has a recess 711a defined in a portion of the outer circumferential surface of the turn shaft 557, the recess 711a being concave toward the central axis 557a of the turn shaft 557. The recess 711a is concave in a substantially V shape.

The presser 712 includes a slider 712a movable toward and away from the cam 711 and an abutment 712b supported on the slider 712a and held in abutment with a surface of the cam 711 that defines the recess 711a. The slider 712a is supported on the case 541. The abutment 712b includes a roller angularly movable about an axis parallel to the central axis 557a of the turn shaft 557.

The biasing member 713 includes a helical spring for pressing the presser 712 against the cam 711. The biasing member 713 has an end held against the case 541 and the other end held against the slider 712a. The biasing member 713 is placed under compression between the case 541 and the slider 712a. The abutment 712b of the presser 712 is pressed into the recess 711a under a biasing force from the biasing member 713.

When the turned position of the steering handle 26 is the reference position referred to above (the steering angle is 0°), the cam 711 is in such an angular position that the recess 711a faces in a forward direction of the vehicle, as depicted in FIG. 25. In this reference position, the recess 711a has its bottom 711b positioned centrally in the transverse directions of the vehicle.

In the reference position, the abutment 712b fits snugly against the bottom 711b of the recess 711a from its front side.

The return-to-origin mechanism 710 keeps the turn shaft 557 in the angular position depicted in FIG. 25 by pressing the abutment 712b into the recess 711a of the cam 711 with the biasing member 713. The turned position of the steering handle 26 is thus kept in the reference position. In other words, the return-to-origin mechanism 710 produces a restoring force for keeping the turned position of the steering handle 26 in the reference position.

Figure 26:
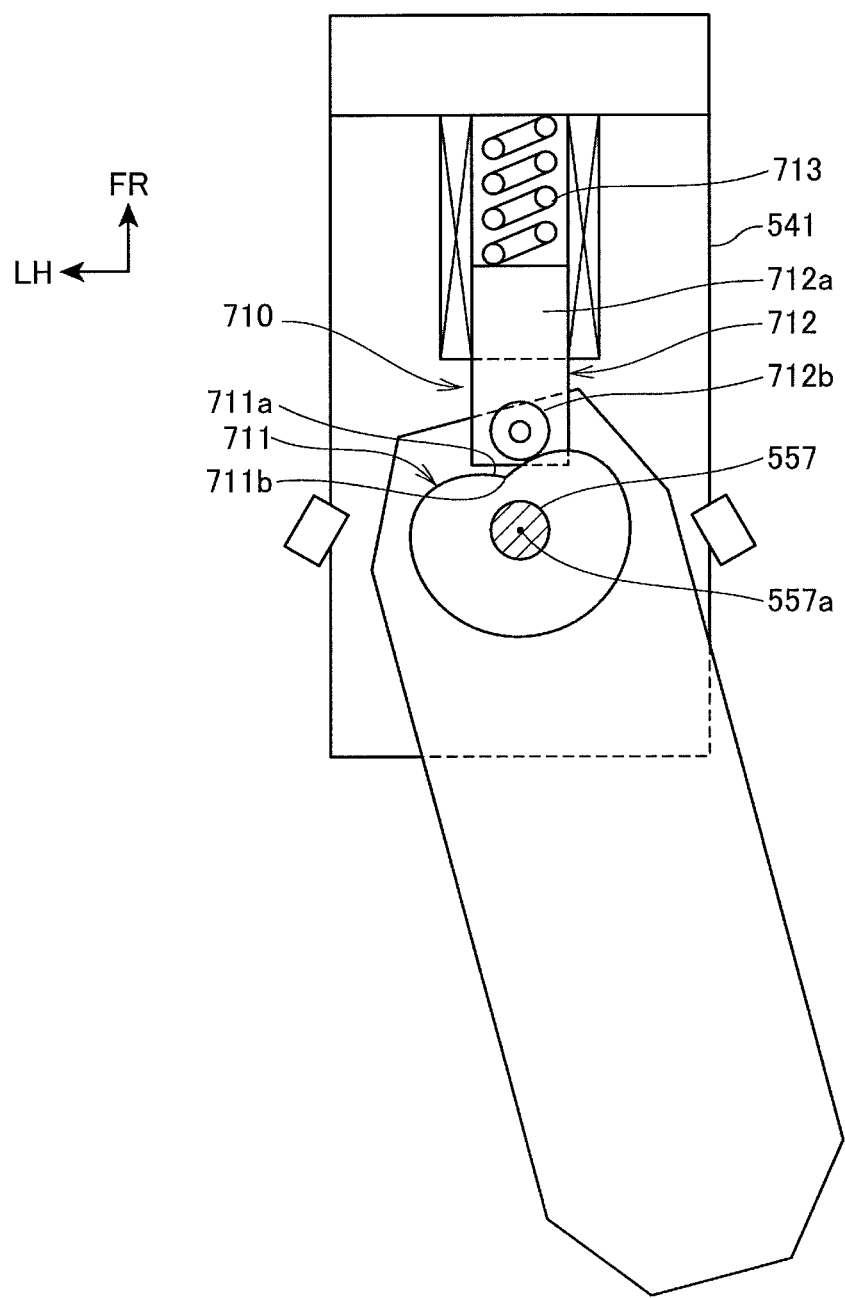
FIG. 26 is a schematic view depicting the state of the return-to-origin mechanism in which a steering handle has been turned.

FIG. 26 is a schematic view depicting the state of the return-to-origin mechanism 710 in which the steering handle 26 has been turned.

In FIG. 26, the handle turning motor 543 has turned the turn shaft 557 to turn the steering handle 26 with respect to the reference position. In this state, the handle turning motor 543 has turned the steering handle 26 against the restoring force produced by the return-to-origin mechanism 710.

In the state depicted in FIG. 26, if the handle turning motor 543 malfunctions and is unable to return the steering handle 26 to the reference position depicted in FIG. 25, then the steering handle 26 returns to the reference position under the restoring force from the return-to-origin mechanism 710. Therefore, even in the event of a malfunction of the handle turning motor 543, the steering handle 26 can quickly return to the reference position.

After having detected a malfunction of the handle turning motor 543, when the controller 83 detects that the steering handle 26 has returned to the reference position on the basis of a signal from the handle steering angle sensor 90, the controller 83 stops actuating the handle turning lock mechanism 544, locking the rotor 542 against rotation. Since the steering handle 26 is now unable to turn with respect to the steering swivel unit 13, the rider can steer the front wheel 2 through the steering handle 26 that has been fixed to the reference position.

Providing the restoring force from the return-to-origin mechanism 710 is sufficiently large, the rider can steer the front wheel 2 through the steering handle 26 that has been fixed to the reference position by the restoring force from the return-to-origin mechanism 710 even if the handle turning lock mechanism 544 does not lock the rotor 542 against rotation.

The above embodiments are given by way of illustrative example only, and the present invention should not be construed as being limited to the first through fifth embodiments described above.

In the first embodiment, the lower portion of the motor body 80b of the steering motor 80 is illustrated as being positioned in the space between the upper frames 18b. However, the present invention is not limited to such a layout. Rather, the motor body 80b of the steering motor 80 may be positioned above the space between the upper frames 18b, insofar as the motor body 80b is positioned between the left and right upper frames 18b in the transverse directions of the vehicle.

In the first through fifth embodiments, the vehicle has been illustrated as including a motorcycle. However, the present invention is not limited to such a vehicle, but is also applicable to three-wheel saddle riding vehicles including two front or rear wheels, saddle riding vehicles having four or more wheels, and saddle riding vehicles such as scooters or the like.

DESCRIPTION OF REFERENCE SYMBOLS

1: Vehicle
10: Vehicle body
11: Vehicle frame
13: Steering swivel unit
17: Head pipe
26: Steering handle
27: Front cover
27b: Upper edge
27c: Extension cover
27d: Rear edge
540: Steering handle turning mechanism
560: Handle holder
810: Cover assembly
811: Fixed cover
812: Movable cover
812c: Opening
812a: Upper wall
812b: Peripheral wall
812d: Rib
813e: Upper opening
Cs: Steering axis

The invention claimed is:

1. A vehicle including a vehicle frame, a steering swivel unit supported on a head pipe of the vehicle frame and angularly movable about a steering axis, and a steering handle mounted on the steering swivel unit, said vehicle comprising:
   a cover assembly covering the steering swivel unit from above, wherein said cover assembly includes:
   a fixed cover fixed to a vehicle body, the fixed cover having a hollow tubular member; and
   a movable cover covering an upper opening defined in the fixed cover and being angularly movable with respect to said fixed cover, the movable cover having a peripheral wall having a same shape as the hollow tubular member,
   wherein said movable cover is angularly movable in unison with said steering handle.

2. The vehicle according to claim 1, wherein said movable cover has an opening defined in an upper wall of said movable cover, and a handle holder that supports said steering handle on said steering swivel unit is fitted in said opening.

3. The vehicle according to claim 2, wherein said opening is shaped complementarily to an outer profile of said handle holder.

4. The vehicle according to claim 2, wherein said movable cover has an upwardly extending rib formed along a peripheral edge of said opening.

5. The vehicle according to claim 1, wherein said movable cover includes an upper wall which is circular in shape as viewed along said steering axis and the peripheral wall extends from a peripheral edge of the upper wall toward said fixed cover.

6. The vehicle according to claim 1, further comprising a front cover which covers said head pipe on a front side of said head pipe,
   wherein said front cover includes an extension cover extending rearwardly from an upper edge of said front cover, said extension cover having a rear edge contiguous to a front edge of said movable cover.

7. A vehicle including a vehicle frame, a steering swivel unit supported on a head pipe of the vehicle frame and angularly movable about a steering axis, and a steering handle mounted on the steering swivel unit, said vehicle comprising:
a cover assembly covering the steering swivel unit from above, wherein said cover assembly includes a fixed cover fixed to a vehicle body and a movable cover covering an upper opening defined in the fixed cover and being angularly movable with respect to said fixed cover, and
a steering handle turning mechanism that makes said steering handle angularly movable about said steering axis relatively to said steering swivel unit,
wherein said cover assembly covers said steering handle turning mechanism from above, and
wherein said movable cover is angularly movable in unison with said steering handle.

8. The vehicle according to claim 1, wherein the hollow tubular member of the fixed cover is cylindrical.

9. The vehicle according to claim 1, wherein the peripheral wall of the movable cover has a same size as the hollow tubular member of the fixed cover so that the peripheral wall of the movable cover is vertically contiguous with the hollow tubular member of the fixed cover.

10. The vehicle according to claim 9, wherein the fixed cover comprises a boxed shaped portion with an upper face and the hollow tubular member extends upward from the upper face.

11. The vehicle according to claim 1, wherein the fixed cover comprises a boxed shaped portion with an upper face and the hollow tubular member extends upward from the upper face.

12. The vehicle according to claim 11, wherein the fixed cover further comprises a rearward extension extending from the boxed shaped portion.

13. The vehicle according to claim 1, wherein the movable cover has a single central opening allowing the passage of steering axis.

14. The vehicle according to claim 1, wherein the head pipe extends downward from the steering handle and a front cover is in front of the cover assembly and covers the head pipe.

15. A vehicle including a vehicle frame, a steering swivel unit supported on a head pipe of the vehicle frame and angularly movable about a steering axis, and a steering handle mounted on the steering swivel unit, said vehicle comprising:
a cover assembly covering the steering swivel unit from above,
wherein said cover assembly includes a fixed cover fixed to a vehicle body and a movable cover covering an upper opening defined in the fixed cover and is angularly movable with respect to said fixed cover,
wherein the fixed cover covers an entire perimeter of the steering axis in the upper opening of the fixed cover,
wherein the vehicle has a front cover that covers the head pipe from a front side of the head pipe,
wherein the fixed cover is provided as a separate part from the front cover, and
wherein the movable cover is angularly movable in unison with said steering handle.

16. A vehicle including a vehicle frame, a steering swivel unit supported on a head pipe of the vehicle frame and angularly movable about a steering axis, and a steering handle mounted on the steering swivel unit, said vehicle comprising:
a cover assembly covering the steering swivel unit from above,
wherein said cover assembly includes a fixed cover fixed to a vehicle body and a movable cover covering an upper opening defined in the fixed cover and is angularly movable with respect to said fixed cover,
wherein the fixed cover covers an entire perimeter of the steering axis in the upper opening of the fixed cover,
wherein the fixed cover comprises a boxed shaped portion and a hollow tubular member disposed centrally, in a transverse direction of the vehicle, on an upper face of the boxed shaped portion and extending toward the fixed cover, an inner peripheral surface of the hollow tubular member defines the upper opening, and
wherein the movable cover is angularly movable in unison with said steering handle.

17. The vehicle according to claim 7, wherein the fixed cover covers an entire perimeter of the steering axis in the upper opening of the fixed cover,
wherein the steering handle turning mechanism is provided at an upper side of the steering swivel unit, and
wherein the movable cover covers the steering handle turning mechanism from above.

* * * * *